(12) United States Patent
Brazeau et al.

(10) Patent No.: US 9,926,138 B1
(45) Date of Patent: Mar. 27, 2018

(54) DETERMINATION OF REMOVAL STRATEGIES

(71) Applicant: Amazon Technologies, Inc., Seattle, WA (US)

(72) Inventors: Jeremiah David Brazeau, Hudson, NH (US); Andrew M. Sweeney, Franklin, MA (US); Henry David Garcia, Marlborough, MA (US); Fred Chen, Westborough, MA (US); Brian Michael Lusignan, Shrewsbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 14/869,566

(22) Filed: Sep. 29, 2015

(51) Int. Cl.
*B65G 1/137* (2006.01)
*B25J 9/00* (2006.01)

(52) U.S. Cl.
CPC .......... *B65G 1/1376* (2013.01); *B25J 9/0093* (2013.01)

(58) Field of Classification Search
USPC ....................................................... 700/214
See application file for complete search history.

(56) References Cited

U.S. PATENT DOCUMENTS

| | | | | |
|---|---|---|---|---|
| 5,041,907 A | * | 8/1991 | Sager | B07C 5/3422 348/91 |
| 2007/0108109 A1 | * | 5/2007 | Erlandsson-Warvelin | B25J 9/1694 209/629 |
| 2007/0216332 A1 | * | 9/2007 | Lambert | B25J 9/1697 318/568.1 |
| 2010/0217528 A1 | * | 8/2010 | Sato | B25J 9/1666 701/301 |
| 2011/0301746 A1 | * | 12/2011 | Gallati | B65G 43/10 700/229 |

* cited by examiner

*Primary Examiner* — Kyle O Logan
(74) *Attorney, Agent, or Firm* — Kilpatrick Townsend & Stockton LLP

(57) ABSTRACT

An item that is moving along a moving surface of an inventory conveyance system may be identified. An orientation of the item with respect to the moving surface may be determined based on sensing information that describes the item and a portion of the moving surface surrounding the item. A removal strategy for operating a robotic arm to remove the item from the moving surface may be determined based at least in part on the item and the orientation. The removal strategy may include a trajectory for the robotic arm to follow as part of removing the item from the moving surface.

23 Claims, 10 Drawing Sheets

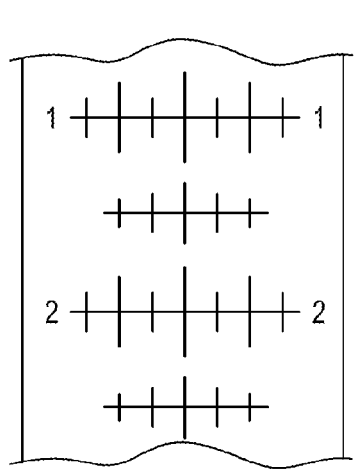
FIG. 9
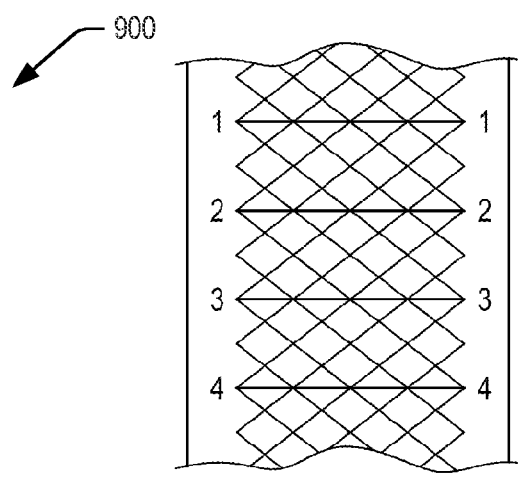
FIG. 10
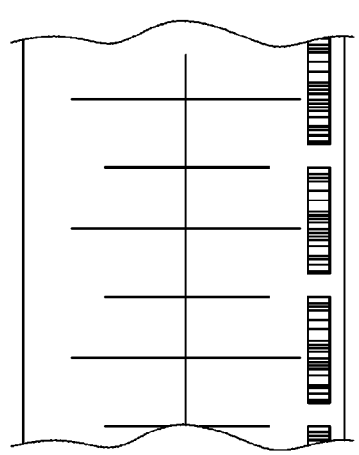
FIG. 11
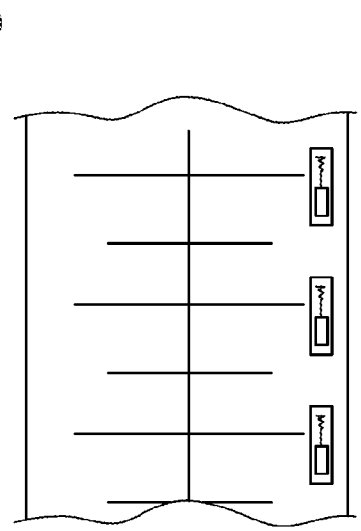
FIG. 12
| A1 | B1 | C1 | D1 | E1 |
|----|----|----|----|----|
| A2 | B2 | C2 | D2 | E2 |
| A3 | B3 | C3 | D3 | E3 |
| A4 | B4 | C4 | D4 | E4 |
| A5 | B5 | C5 | D5 | E5 |
| A6 | B6 | C6 | D6 | E6 |
| A7 | B7 | C7 | D7 | E7 |
FIG. 13

DETERMINATION OF REMOVAL STRATEGIES

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which:

FIGS. 9-13 illustrate examples of moving surfaces, according to at least some embodiments;

DETAILED DESCRIPTION

Figure 1:
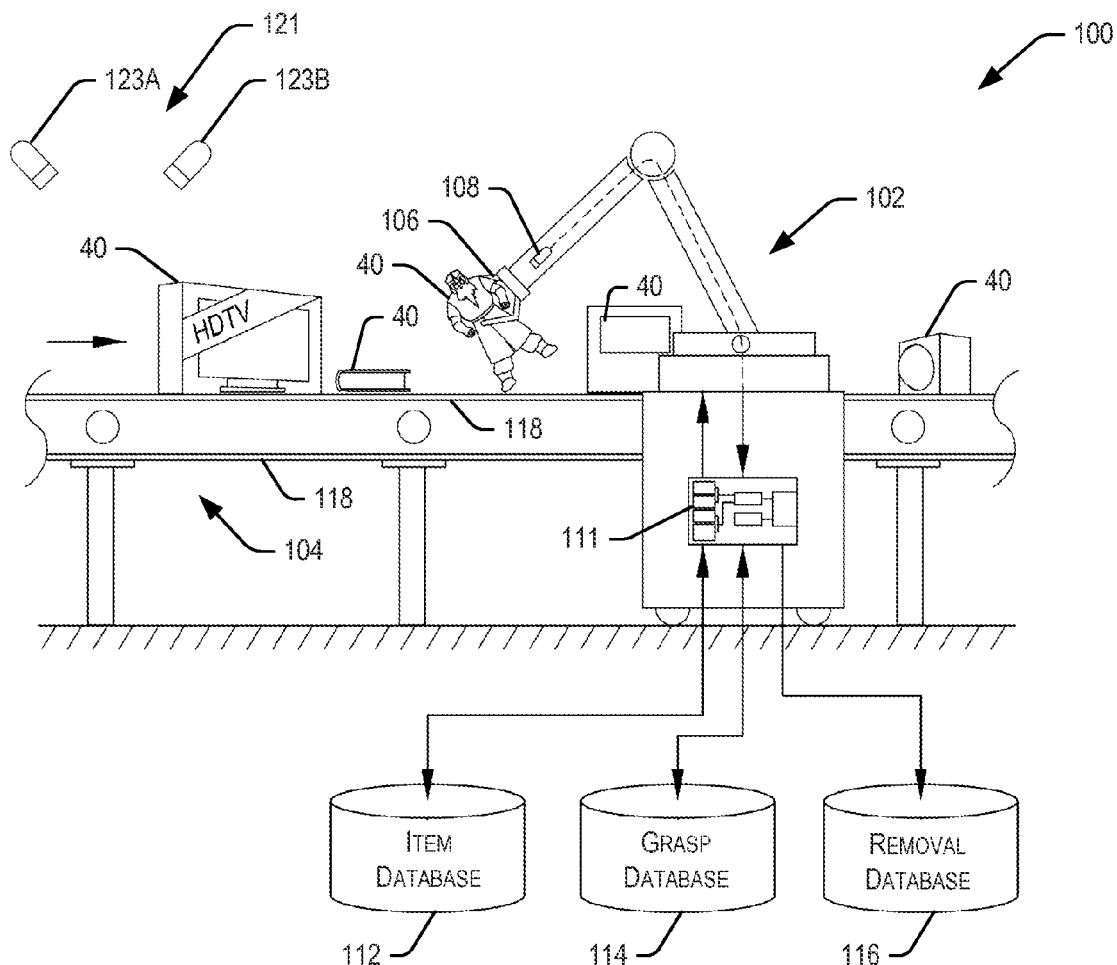
FIG. 1 illustrates a diagram including a robotic manipulator depicting techniques relating to removal of items from moving surfaces by robotic manipulators as described herein, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and mobile drive units for moving the inventory holders. In particular, features herein are directed to robotic arms or manipulators and associated components that may facilitate the movement of inventory items from inventory conveyance systems in connection with the mobile drive units. Such movement may include movement of inventory items from moving surfaces of inventory conveyance systems. For example, an inventory conveyance system may include a moving surface that may be configured to carry various inventory items having differing shapes, sizes, and weights. A robotic arm may be disposed adjacent the moving surface and configured to remove inventory items from the moving surface by grasping the inventory items and removing them from the moving surface. The manner in which the robotic arm will approach a particular inventory item, grasp the particular inventory item, and remove the particular inventory item from the moving surface may be planned prior to the particular inventory item passing by the robotic arm. This removal plan may be provided to a computer controlling the robotic arm or directly to components of the robotic arm in the form of instructions to operate the components to execute the plan.

In some examples, techniques described herein may be equally applicable to placement of items onto a moving surface as to removal of items from the moving surface. In a placement example, a placement plan may be determined in a manner that considers a retrieval location of an item, characteristics of the item, available area on the moving surface where the item could be placed, items already on the moving surface, and/or a rate at which the moving surface is moving. In some examples, the determination of removal plans and placement plans may be coordinated between a plurality of robotic arms in a manner that considers conditions in which items are expected to be found based on execution of other removal and placement plans. In this manner, removal and placement of items may be preplanned based on expected movement of other items to and from the moving surface.

In a particular example, an inventory system may include a moving conveyor belt on which inventory items of various dimensions are moved throughout a warehouse. After the inventory items are loaded onto the conveyor belt, a series of cameras may take images of each inventory item. The images may be used to identify each inventory item, determine a relative position of each inventory item with respect to the conveyor belt, and determine an orientation of each inventory item. For a particular inventory item, the relative position may be determined by using a conveyor belt that includes a marking pattern that describes particular locations on the conveyor belt. For example, a series of graduations with corresponding numbers like those found on conventional rulers may be printed on the conveyor belt. The images may depict the inventory item and a portion of the marking pattern. Based on this, the relative location may be determined. Based on the identity of the particular inventory item, its position, and its orientation, a removal strategy may be determined. The removal strategy may include a plan that describes how the robotic arm is to remove the particular inventory item. For example, the removal strategy may indicate a beginning orientation of the robotic arm, a trajectory for the robotic arm to approach the particular inventory item and to depart away from the conveyor belt, a grasping strategy of the robotic arm, and any other suitable information. The removal strategy may be provided to the robotic arm in the form of instructions executable by components of the robotic arm.

Referring now to the drawings in which like-referenced numerals and/or names may refer to like elements, FIG. 1 illustrates an inventory system 100 having a robotic arm or manipulator 102 configured to remove inventory items 40 from an inventory conveyance system 104. The robotic arm 102 may include an end effector 106, a sensor 108 in communication with a controller 111, and the controller 111 in communication with one or more databases including, for example, an item database 112, a grasp database 114, and a removal database 116.

The inventory conveyance system 104 may include a moving surface 118, which may be configured to move the inventory items 40 in the direction of the arrow (i.e., from left to right across FIG. 1). The moving surface 118 may be any suitable mechanism capable of carrying the inventory items 40. For example, the moving surface 118 may be a continuous conveyor belt or one or more continuous conveyor belts coupled in a series configuration.

As the inventory items 40 are moving along the moving surface 118, a sensor package 121, which may include one or more sensors 123 (of like or varying type, e.g., optical sensors, position sensors, photoelectric sensors, infrared sensors, imaging devices, radio-frequency identification (RFID) readers, acoustic sensors, and any other suitable sensor configured to detect the inventory items 40), may be arranged to detect the inventory items 40. For example, after an inventory item 40 has been placed on the moving surface 118, the inventory conveyance system 104 may move the inventory item 40 toward the sensor package 121, which may be encountered prior to the inventory item 40 encountering the robotic arm 102. The sensor package 121 may detect attributes, such as a weight, optical characteristics (e.g., product names, descriptions, including trademarks and other descriptors), geometric characteristics (e.g., size, position or orientation), electrical conductivity, magnetic properties, surface characteristics (e.g., how slippery or porous the item is), deformability, and/or structural integrity of the inventory item 40, and communicate such attributes to the controller 111 of the robotic arm 102. The detected attributes may also include a unique identifier of the inventory item 40, such as a barcode or RFID-encoded serial number. Based on the detected attributes, the controller 111 may access the item database 112, such as to access a record for the inventory item 40. The record can include information about attributes of the inventory item, such as weight, shape, size, or other physical characteristics of the inventory item. In the event that detected attributes do not identify the inventory item 40 on their own, the detected attributes can be compared with attributes from the record in the item database 112 to identify the inventory item 40. Identifying the inventory item 40 may include identifying a class or type of items to which the inventory item 40 belongs. For example, the detected attributes may be used to identify a high-definition television (HDTV) item 40 as a rectangular box having certain dimensions and weight, or may identify the HDTV item 40 as a "55 inch Brand X TV," from which corresponding attributes of the HDTV item 40 may be determined by accessing a record in the item database 112 that corresponds to the HDTV item 40.

The geometric attributes may indicate a position of the inventory item 40 with respect to the inventory conveyance system 104, other inventory items 40, or components of the inventory conveyance system 104 (e.g., the moving surface 118). The geometric attributes may also indicate an orientation of the inventory item 40. In some examples, the orientation and/or the position may be relative to other inventory items 40 that are ahead of, behind or otherwise adjacent to the inventory item 40. In this manner, the geometric attributes may indicate geometric characteristics of the inventory item 40 and geometric characteristics of surrounding inventory items 40. The geometric characteristics of the surrounding inventory items 40 may be relevant to determining a removal strategy for the inventory item 40.

Based on the record from the item database 112 and/or the detected attributes from the sensor package 121 and a movement rate of the inventory conveyance system 104, the controller 111 may determine a removal strategy for the inventory item 40 or items with similar characteristics. The movement rate of the inventory conveyance system 104 may indicate an instantaneous or average speed at which the moving surface 118 is moving. Because the inventory items 40 are located on the moving surface 118, the movement rate may correspond to the speed at which the inventory items 40 are moving. In some examples, the movement rate may be received from a component of the inventory conveyance system 104 (e.g., a speed module, electric motor, computing device, or any other suitable component capable of outputting speed data) or determined based on information derived from sensor package 121 or any other suitable sensor.

In some examples, the controller 111 may access the removal strategy from the removal database 116 as part of determining the removal strategy. In this example, at least a portion of the removal strategies may be pre-computed and stored in the removal database 116 and arranged according to inventory items and/or characteristics of the inventory item 40. In this manner, the controller 111 may determine a removal strategy that is customized to the particular inventory item 40, general for inventory items of similar characteristics and orientations of the particular inventory item 40, and modified for the particular inventory item 40. In some examples, the removal strategy may be determined based at least in part on a grasping strategy for the inventory item 40 or items with similar characteristics. The relevant grasping strategy may be accessed from the grasp database 114.

The controller 111 may provide instructions to the robotic arm 102 for removing the inventory item 40 based on the removal strategy determined and/or accessed from the removal database 116. The removal strategy may include information about operating the robotic arm 102 in a manner that will remove the inventory item 40 from the moving surface without affecting the other inventory items 40. The removal strategy may also include information about the inventory item 40 that the robotic arm 102 will be removing as part of the removal strategy. For example, the removal strategy may indicate initial conditions of the inventory item 40 according to which the removal strategy was determined by the controller 111. As part of executing the removal strategy, the robotic arm 102 may receive information from the sensor 108 the detects the inventory item 40 and its surroundings just prior to the robotic arm 102 approaching the inventory item 40 to remove the inventory item 40. In some examples, the sensor 108 may detect similar information as detected by the sensor package 121. In this manner, the controller 111 may compare the initial conditions with those detected by sensor 108. If the differences exceed some threshold (e.g., if the inventory item 40 has fallen over resulting in a change in orientation and/or position), the controller 111 may instruct the robotic arm 102 to cease execution of the removal strategy. Thus, the sensor 108 may collect information that is closer to real-time when the robotic arm 102 is being operated to remove the inventory item 40.

In some aspects, the controller 111 may provide instructions to the robotic arm 102 for gripping the inventory item 40 based on a grasping strategy accessed from the grasp database 114 and, based on the selected grasping strategy, access a removal strategy for the inventory item 40. In other aspects, the controller 111 may access a particular grasping strategy from the grasp database 114 based on the removal strategy determined or accessed from the removal database 116. The item database 112, the grasp database 114, and the removal database 116 (or any combination thereof), although depicted as separate in FIG. 1, may share structure and/or content. Additionally, although the description herein primarily refers to a robotic arm, any other mechatronic or robotic device may be used in lieu of or in addition to an arm.

Figure 2:
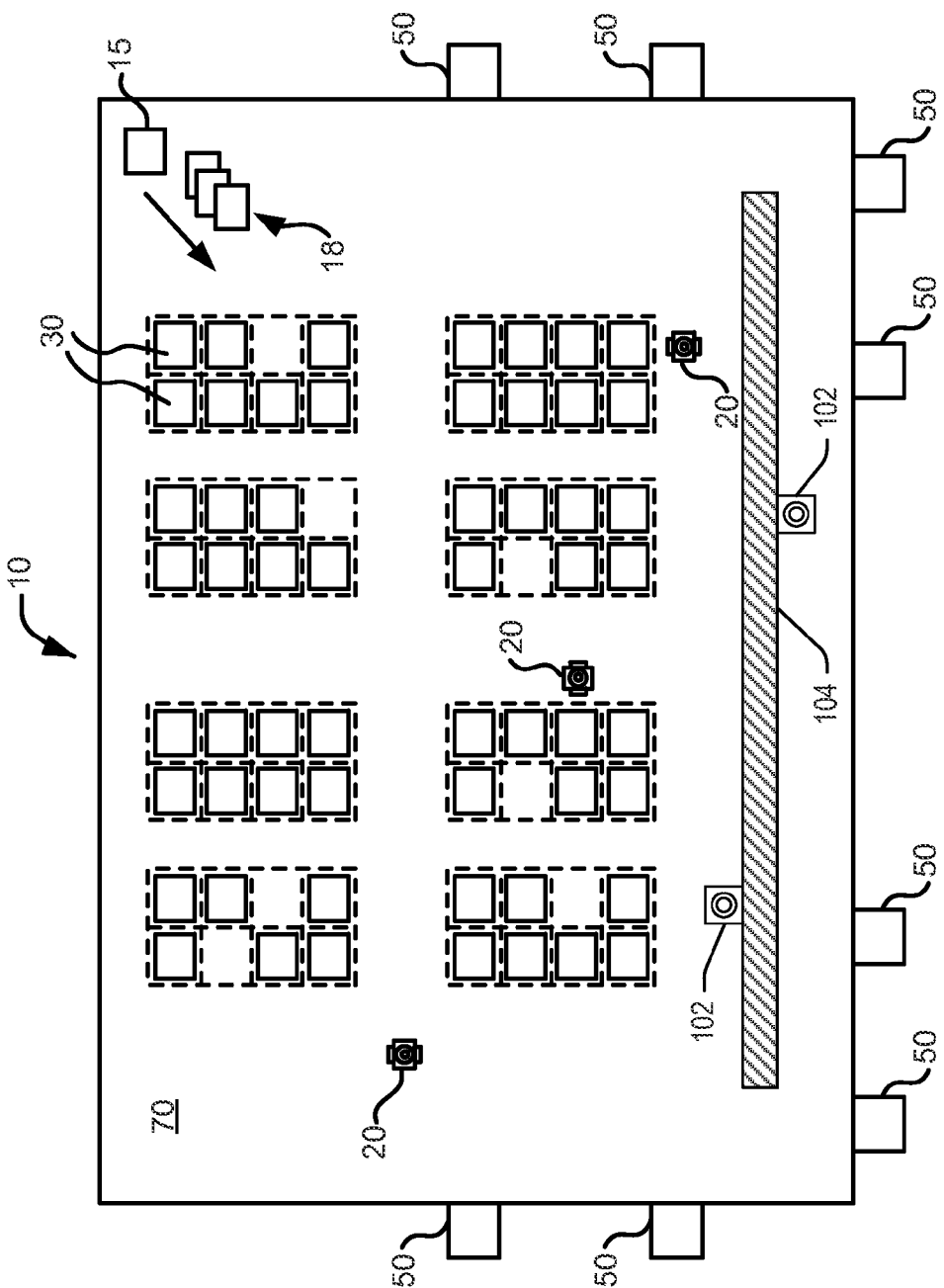
FIG. 2 illustrates components of an inventory system which may be utilized to implement techniques relating to removal of items from moving surfaces by robotic manipulators, according to at least one embodiment.

FIG. 2 illustrates the components of an inventory system 10 that may be used to implement the techniques described herein. The inventory system 10 may include the management module 15, one or more mobile drive units 20, one or more inventory holders 30, an inventory conveyance system 104, one or more robotic arms 102, and one or more inventory stations 50. The mobile drive units 20 transport the inventory holders 30 between points within a workspace 70 in response to commands communicated by the management module 15. The robotic arms 102 may place and retrieve inventory, including inventory items 40, from the inventory conveyance system 104, the inventory holders 30, and from any other suitable holder of inventory. The inventory conveyance system 104 may include more than one conveyance system and may be configured to transport inventory items 40 and inventory containers between positions within the workspace 70. In some examples, the inventory conveyance system 104 is a continuous belt that extends throughout the workspace 70. For example, the inventory conveyance system 104 may follow a perimeter of the workspace 70 and be configured such that inventory is placed onto the inventory conveyance system 104 from a first side and retrieved from the inventory conveyance system 104 from a second side. Each of the inventory holders 30 may be configured with one or more compartments for containing one or more inventory items. In some examples, the inventory holders 30 may be inventory holders configured to hold one or more containers which may hold inventory items. Thus, the inventory system 10 may be capable of moving inventory items between locations within the workspace 70 to facilitate the entry, processing, and/or removal of inventory items from the inventory system 10 and the completion of other tasks involving inventory items.

In some examples, inbound inventory items 40 may be received and loaded onto the inventory conveyance system 104. The inbound inventory items 40 may be characterized as "inbound" because they have recently arrived at the workspace 70 (e.g., from a manufacturer, a different workspace, or from any other suitable entity). In some examples, the inbound inventory items 40 may include inventory that is identified to be stored in the workspace 70. This may be inventory that is not presently associated with a customer order. The inbound inventory items 40 may also include inventory that is already associated with a customer order. In any event, the inbound inventory items 40 may be loaded onto the inventory conveyance system 104. In accordance with techniques described herein, the robotic arms 102 may be instructed to retrieve a particular inventory item 40 from the inventory conveyance system 104. In this manner, the inventory conveyance system 104 may function as a buffer between the decanting process, e.g., wherein inbounded inventory items 40 are unloaded onto the inventory conveyance system 104 and the stowing process, e.g., wherein items are stowed into the inventory holders 30 and held as inventory.

In the case of inventory that is not presently associated with a customer order, the robotic arm 102 may place the particular inventory item 40 into one of the inventory holders 30. One of the mobile drive units 20 may then move the inventory holder 30 to a storage area within the workspace 70. In this manner, the particular inventory item 40 may be stored in the workspace 70 until it is requested for a customer order. When requested, the particular inventory item 40 may become an outbound inventory item 40, as discussed herein. In the case of inbound inventory items 40 that are associated with customer orders, the robotic arms 102 may retrieve these inventory items and place them into the inventory holders 30. The mobile drive units 20 may move these inventory holders 30 to other various locations within the workspace 70. For example, a first inventory holder 30 may be moved to an inventory station 50 where the inventory items 40 are packed into boxes and shipped to the customers. In some examples, a second inventory holder 30 may be moved to an inventory station 50 where the inventory items 40 are counted.

The inventory conveyance system 104 may also function as a buffer for outbound inventory items 40. The outbound inventory items 40 may be "outbound" because they are associated with a customer order or are otherwise identified as items to move about the workspace 70 (e.g., from one station 50 to a second station 50 or from one workspace to a different workspace). In some examples, once a customer order is received, a location of a particular inventory item 40 associated with the order may be determined. One of the mobile drive units 20 may be directed to the location and retrieve the inventory holder 30 in which the particular inventory item 40 is stowed. The mobile drive unit 20 may transport the inventory holder 30 to the inventory conveyance system 104 where the particular inventory item 40 may be placed on the inventory conveyance system 104. In some examples, one of the robotic arms 102 removes the particular inventory item 40 from the inventory holder 30 and places it on a moving surface of the inventory conveyance system 104. A different (or the same) robotic arm 102 may later remove the particular inventory item 40 and place it in a different inventory holder 30 to be transported by one of the mobile drive units 20 to an inventory station 50 where the particular inventory item 40 can be included in a packing box and shipped to the customer. In some examples, one of the robotic arms 102 removes the particular inventory item 40 from the inventory conveyance system 104 and places the particular inventory item 40 at the inventory station 50 where the particular inventory item 40 can be included in the packing box and shipped to the customer. Thus, the robotic arm 102 may remove and place inventory items 40 into inventory holders 30, inventory stations 50, and any other suitable location within reach of the robotic arm 102 (e.g., on a second floor). In some examples, the robotic arm 102 is configured to toss the inventory items 40 to different locations (e.g., inventory bins, collectors, or the like) and/or to the same locations described herein.

The management module 15 may assign tasks to appropriate components of the inventory system 10 and coordinate operation of the various components in completing the tasks. These tasks may relate not only to the movement and processing of inventory items, but also to the management and maintenance of the components of the inventory system 10. For example, the management module 15 may assign portions of the workspace 70 as parking spaces for the mobile drive units 20, the scheduled recharge or replacement of mobile drive unit batteries, the storage of the inventory holders 30, or any other operations associated with the functionality supported by the inventory system 10 and its various components. The management module 15 may select components of the inventory system 10 to perform these tasks and communicate appropriate commands and/or data to the selected components to facilitate completion of these operations. Although shown in FIG. 2 as a single, discrete component, the management module 15 may represent multiple components and may represent or include portions of the mobile drive units 20 or other components of the inventory system 10. As a result, any or all of the interaction between a particular mobile drive unit 20 and the management module 15 that is described below may, in particular embodiments, represent peer-to-peer communication between that mobile drive unit 20 and one or more other mobile drive units 20. The components and operation of an example embodiment of the management module 15 are discussed further below with respect to FIG. 3. In some examples, the management module 15 may be distributed between a server, the robotic arms 102, and/or the mobile drive units 20. In this example, the server may provide instructions to the robotic arms 102 and the mobile drive units 20 which may process the instructions and generate other instructions to manage components of the robotic arms 102 and the mobile drive units 20. In some examples, the management module 15 may include any suitable combination of analog and digital components configured to implement the techniques described herein.

The mobile drive units 20 may move the inventory holders 30 between locations within the workspace 70. The mobile drive units 20 may represent any devices or components appropriate for use in the inventory system 10 based on the characteristics and configuration of the inventory holders 30 and/or other elements of the inventory system 10. In a particular embodiment of the inventory system 10, the mobile drive units 20 represent independent, self-powered devices configured to freely move about the workspace 70. In alternative embodiments, the mobile drive units 20 represent elements of a tracked inventory system configured to move the inventory holders 30 along tracks, rails, cables, crane system, or other guidance or support elements traversing the workspace 70. In such an embodiment, the mobile drive units 20 may receive power and/or support through a connection to the guidance elements, such as a powered rail. Additionally, in particular embodiments of the inventory system 10, the mobile drive units 20 may be configured to utilize alternative conveyance equipment to move within the workspace 70 and/or between separate portions of the workspace 70.

Additionally, the mobile drive units 20 may be capable of communicating with the management module 15 to receive information identifying selected inventory holders 30, transmit the locations of the mobile drive units 20, or exchange any other suitable information to be used by the management module 15 or the mobile drive units 20 during operation. The mobile drive units 20 may communicate with the management module 15 wirelessly, using wired connections between the mobile drive units 20 and the management module 15, and/or in any other appropriate manner. As one example, particular embodiments of the mobile drive unit 20 may communicate with the management module 15 and/or with one another using 802.11, Bluetooth, or Infrared Data Association (IrDA) standards, or any other appropriate wireless communication protocol. As another example, in a tracked inventory system 10, tracks or other guidance elements upon which the mobile drive units 20 move may be wired to facilitate communication between the mobile drive units 20 and other components of the inventory system 10. Furthermore, as noted above, the management module 15 may include components of individual mobile drive units 20. Thus, for the purposes of this description and the claims that follow, communication between the management module 15 and a particular mobile drive unit 20 may represent communication between components of a particular mobile drive unit 20. In general, the mobile drive units 20 may be powered, propelled, and controlled in any manner appropriate based on the configuration and characteristics of the inventory system 10.

In some examples, the inventory holders 30 may store inventory items within containers. In a particular embodiment, the inventory holders 30 may include multiple storage shelves with each storage shelf capable of holding one or more containers. Within each container may be held one or more types of inventory items. The inventory holders 30 are capable of being carried, rolled, and/or otherwise moved by the mobile drive units 20. In particular embodiments, the inventory holder 30 may provide additional propulsion to supplement that provided by the mobile drive unit 20 when moving the inventory holder 30. In some examples, the inventory holders 30 may store inventory items within one or more storage bins.

Additionally, in particular embodiments, inventory items 40 may also hang from hooks or bars (not shown) within or on the inventory holder 30. In general, the inventory holder 30 may store the inventory items 40 in any appropriate manner within the inventory holder 30 and/or on the external surface of the inventory holder 30.

Additionally, each inventory holder 30 may include a plurality of faces. In some examples, each container may be accessible through one or more faces of the inventory holder 30. For example, in a particular embodiment, the inventory holder 30 includes four faces. In such an embodiment, containers located at a corner of two faces may be accessible through either of those two faces, while each of the other containers is accessible through an opening in one of the four faces. The mobile drive unit 20 may be configured to rotate the inventory holder 30 at appropriate times to present a particular face and the containers accessible from that face to an operator or other components of the inventory system 10.

Inventory items represent any objects suitable for storage, retrieval, and/or processing in an automated inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail order warehouse facility, and inventory items may represent merchandise stored in the warehouse facility. During operation, the mobile drive units 20 may retrieve the inventory holders 30 containing one or more inventory items requested in an order to 1i be packed for delivery to a customer or the inventory holders 30 carrying pallets containing aggregated collections of inventory items for shipment. Moreover, in particular embodiments of the inventory system 10, boxes containing completed orders may themselves represent inventory items.

In particular embodiments, the inventory system 10 may also include one or more inventory stations 50. The inventory stations 50 represent locations designated for the completion of particular tasks involving inventory items. Such tasks may include the removal of inventory items and/or containers from the inventory holders 30, the introduction of inventory items and/or containers into the inventory holders 30, the counting of inventory items and/or containers in the inventory holders 30, the decomposition of inventory items (e.g. from pallet- or case-sized groups to individual inventory items) into containers in the inventory holders 30, the consolidation of inventory items and/or containers between the inventory holders 30, transfer of inventory items and/or containers between the inventory holders 30, and/or the processing or handling of inventory items in any other suitable manner. In particular embodiments, the inventory stations 50 may just represent the physical locations where a particular task involving inventory items can be completed within the workspace 70. In alternative embodiments, the inventory stations 50 may represent both the physical location and also any appropriate equipment for processing or handling inventory items, such as scanners for monitoring the flow of inventory items in and out of the inventory system 10, communication interfaces for communicating with the management module 15, and/or any other suitable components. The inventory stations 50 may be controlled, entirely or in part, by human operators or may be fully automated. Moreover, the human or automated operators of the inventory stations 50 may be capable of performing certain tasks to inventory items, such as packing, counting, or transferring inventory items, as part of the operation of the inventory system 10.

The workspace 70 represents an area associated with the inventory system 10 in which the mobile drive units 20 can move and/or the inventory holders 30 can be stored. For example, the workspace 70 may represent all or part of the floor of a mail-order warehouse in which the inventory system 10 operates. Although FIG. 2 shows, for the purposes of illustration, an embodiment of the inventory system 10 in which the workspace 70 includes a fixed, predetermined, and finite physical space, particular embodiments of the inventory system 10 may include the mobile drive units 20 and the inventory holders 30 that are configured to operate within a workspace 70 that is of variable dimensions and/or an arbitrary geometry. While FIG. 2 illustrates a particular embodiment of the inventory system 10 in which the workspace 70 is entirely enclosed in a building, alternative embodiments may utilize workspaces 70 in which some or all of the workspace 70 is located outdoors, within a vehicle (such as a cargo ship), located across more than one floor, or otherwise unconstrained by any fixed structure.

In operation, the management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of the mobile drive units 20, the inventory holders 30, the inventory stations 50 and other components of the inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, the management module 15 generates the task assignments 18 based, in part, on inventory requests that the management module 15 receives from other components of the inventory system 10 and/or from external components in communication with the management module 15. These inventory requests identify particular operations to be completed involving inventory items stored or to be stored within the inventory system 10 and may represent communication of any suitable form. For example, in particular embodiments, an inventory request may represent a shipping order specifying particular inventory items that have been purchased by a customer and that are to be retrieved from the inventory system 10 for shipment to the customer. The management module 15 may also generate the task assignments 18 independently of such inventory requests, as part of the overall management and maintenance of the inventory system 10. For example, the management module 15 may generate the task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of the inventory system 10. After generating one or more task assignments 18, management module 15 transmits the generated task assignments 18 to appropriate components for completion of the corresponding task. The relevant components then execute their assigned tasks.

With respect to the mobile drive units 20 specifically, the management module 15 may, in particular embodiments, communicate the task assignments 18 to selected mobile drive units 20 that identify one or more destinations for the selected mobile drive units 20. The management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of the inventory system 10, as a whole, or individual components of the inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks, the mobile drive units 20 may dock with and transport the inventory holders 30 within the workspace 70. In some examples, docking with an inventory holder 30 may include coupling components of the mobile drive unit 20 to components of the inventory holder 30. The mobile drive units 20 may dock with the inventory holders 30 by connecting to, lifting, and/or otherwise interacting with the inventory holders 30 in any other suitable manner so that, when docked, the mobile drive units 20 are coupled to and/or support the inventory holders 30 and can move the inventory holders 30 within the workspace 70. While the description below focuses on particular embodiments of the mobile drive unit 20 and the inventory holder 30 that are configured to dock in a particular manner, alternative embodiments of the mobile drive unit 20 and the inventory holder 30 may be configured to dock in any manner suitable to allow the mobile drive unit 20 to move the inventory holder 30 within the workspace 70. Additionally, as noted below, in particular embodiments, the mobile drive units 20 represent all or portions of the inventory holders 30. In such embodiments, the mobile drive units 20 may not dock with the inventory holders 30 before transporting the inventory holders 30 and/or the mobile drive units 20 may each remain continually docked with a particular inventory holder 30.

While the appropriate components of the inventory system 10 complete assigned tasks, the management module 15 may interact with the relevant components to ensure the efficient use of space, equipment, manpower, and other resources available to the inventory system 10. As one specific example of such interaction, the management module 15 is responsible, in particular embodiments, for planning the paths the mobile drive units 20 take when moving within the workspace 70 and for allocating use of a particular portion of the workspace 70 to a particular mobile drive unit 20 for purposes of completing an assigned task. In such embodiments, the mobile drive units 20 may, in response to being assigned a task, request a path to a particular destination associated with the task. Moreover, while the description below focuses on one or more embodiments in which the mobile drive unit 20 requests paths from the management module 15, the mobile drive unit 20 may, in alternative embodiments, generate its own paths.

Components of the inventory system 10 may provide information to the management module 15 regarding their current state, other components of the inventory system 10 with which they are interacting, and/or other conditions relevant to the operation of the inventory system 10. This may allow the management module 15 to utilize feedback from the relevant components to update algorithm parameters, adjust policies, or otherwise modify its decision-making to respond to changes in operating conditions or the occurrence of particular events.

In addition, while the management module 15 may be configured to manage various aspects of the operation of the components of the inventory system 10, in particular embodiments, the components themselves may also be responsible for decision-making relating to certain aspects of their operation, thereby reducing the processing load on the management module 15.

Thus, based on its knowledge of the location, current state, and/or other characteristics of the various components of the inventory system 10 and an awareness of all the tasks currently being completed, the management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 10 may be able to support a number of techniques for efficiently executing various aspects of the operation of the inventory system 10. As a result, particular embodiments of the management module 15 may, by implementing one or more management techniques described below, enhance the efficiency of the inventory system 10 and/or provide other operational benefits.

Figure 3:
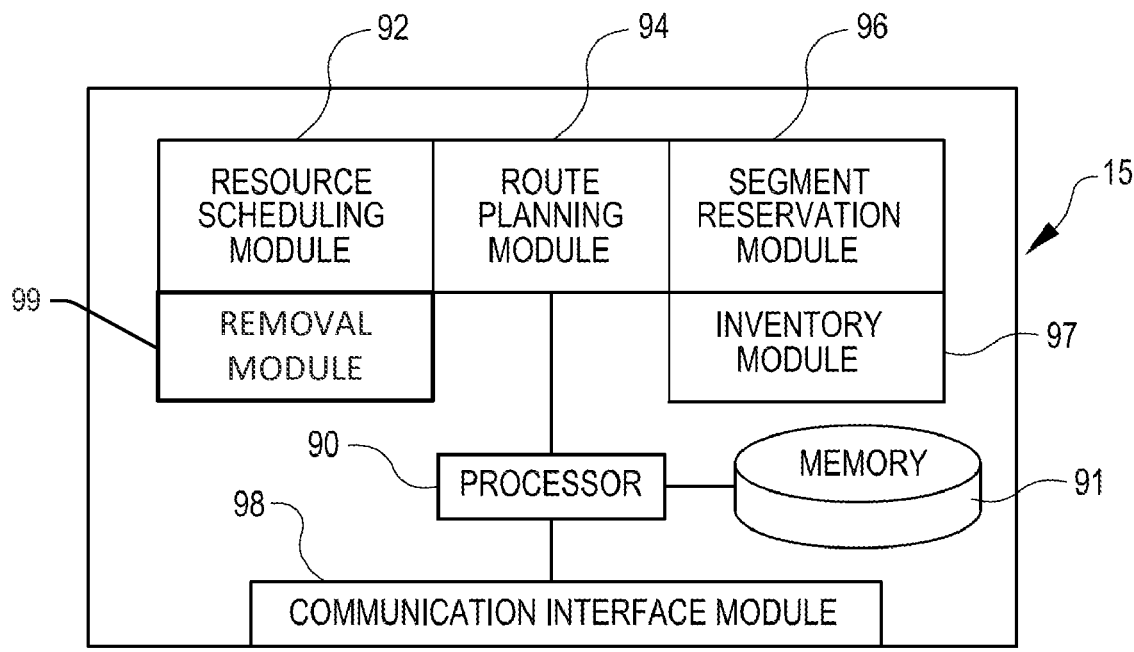
FIG. 3 illustrates in greater detail components of an example management module that may be utilized to implement techniques relating to removal of items from moving surfaces by robotic manipulators as described herein, according to at least one embodiment.

FIG. 3 illustrates in greater detail the components of a particular embodiment of the management module 15. As shown, the example embodiment includes a resource scheduling module 92, a route planning module 94, a segment reservation module 96, an inventory module 97, a removal module 99, a communication interface module 98, a processor 90, and a memory 91. The management module 15 may represent a single component, multiple components located at a central location within the inventory system 10, or multiple components distributed throughout inventory system 10. For example, the management module 15 may represent components of one or more mobile drive units 20 that are capable of communicating information between the mobile drive units 20 and coordinating the movement of the mobile drive units 20 within the workspace 70. In general, the management module 15 may include any appropriate combination of hardware and/or software suitable to provide the described functionality.

The processor 90 is operable to execute instructions associated with the functionality provided by the management module 15. The processor 90 may comprise one or more general purpose computers, dedicated microprocessors, or other processing devices capable of communicating electronic information. Examples of the processor 90 include one or more application-specific integrated circuits (ASICs), field programmable gate arrays (FPGAs), digital signal processors (DSPs) and any other suitable specific or general purpose processors.

The memory 91 stores processor instructions, inventory requests, reservation information, state information for the various components of the inventory system 10 and/or any other appropriate values, parameters, or information utilized by the management module 15 during operation. The memory 91 may represent any collection and arrangement of volatile or nonvolatile, local or remote devices suitable for storing data. Examples of the memory 91 include, but are not limited to, random access memory (RAM) devices, read only memory (ROM) devices, magnetic storage devices, optical storage devices or any other suitable data storage devices.

The resource scheduling module 92 processes received inventory requests and generates one or more assigned tasks to be completed by the components of the inventory system 10. The resource scheduling module 92 may also select one or more appropriate components for completing the assigned tasks and, using the communication interface module 98, communicate the assigned tasks to the relevant components. Additionally, the resource scheduling module 92 may also be responsible for generating assigned tasks associated with various management operations, such as prompting the mobile drive units 20 to recharge batteries or have batteries replaced, instructing the inactive mobile drive units 20 to park in a location outside the anticipated traffic flow or a location near the anticipated site of future tasks, and/or directing the mobile drive units 20 selected for repair or maintenance to move towards a designated maintenance station.

The route planning module 94 receives route requests from the mobile drive units 20. These route requests identify one or more destinations associated with a task the requesting mobile drive unit 20 is executing. In response to receiving a route request, the route planning module 94 generates a path to one or more destinations identified in the route request. The route planning module 94 may implement any appropriate algorithms utilizing any appropriate parameters, factors, and/or considerations to determine the appropriate path. After generating an appropriate path, the route planning module 94 transmits a route response identifying the generated path to the requesting mobile drive unit 20 using the communication interface module 98.

The segment reservation module 96 receives reservation requests from the mobile drive units 20 attempting to move along paths generated by the route planning module 94. These reservation requests request the use of a particular portion of the workspace 70 (referred to herein as a "segment") to allow the requesting mobile drive unit 20 to avoid collisions with other mobile drive units 20 while moving across the reserved segment. In response to received reservation requests, the segment reservation module 96 transmits a reservation response granting or denying the reservation request to the requesting mobile drive unit 20 using the communication interface module 98.

The inventory module 97 maintains information about the location and number of the inventory items 40 in the inventory system 10. Information can be maintained about the number of the inventory items 40 in a particular inventory holder 30, and the maintained information can include the location of those inventory items 40 in the inventory holder 30. The inventory module 97 can also communicate with the mobile drive units 20, utilizing the task assignments 18 to maintain, replenish or move the inventory items 40 within the inventory system 10.

The communication interface module 98 facilitates communication between the management module 15 and other components of the inventory system 10, including reservation responses, reservation requests, route requests, route responses, and task assignments. These reservation responses, reservation requests, route requests, route responses, and task assignments may represent communication of any form appropriate based on the capabilities of the management module 15 and may include any suitable information. Depending on the configuration of the management module 15, the communication interface module 98 may be responsible for facilitating either or both of wired and wireless communication between the management module 15 and the various components of the inventory system 10. In particular embodiments, the management module 15 may communicate using communication protocols such as 802.11, Bluetooth, or Infrared Data Association (IrDA) standards. Furthermore, the management module 15 may, in particular embodiments, represent a portion of the mobile drive unit 20 or other components of the inventory system 10. In such embodiments, the communication interface module 98 may facilitate communication between the management module 15 and other parts of the same system component.

Figure 4:
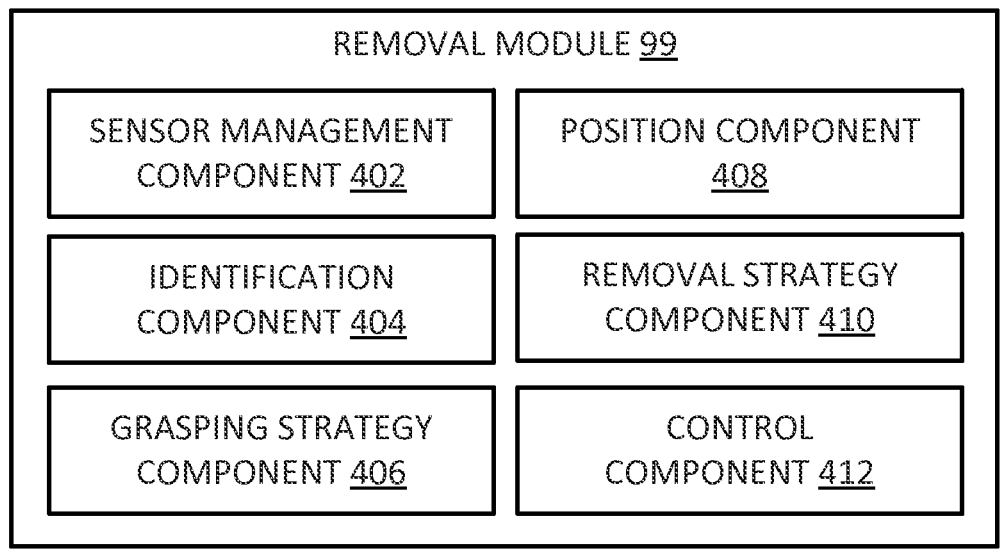
FIG. 4 illustrates in greater detail components of a removal module that may be utilized to implement techniques relating to removal of items from moving surfaces by robotic manipulators as described herein, according to at least one embodiment.

The removal module 99 is configured to implement the techniques described herein related to removal of items from moving surfaces by robotic manipulators and placement of items onto moving surfaces by robotic manipulators. To this end, FIG. 4 illustrates an example removal module 99. The removal module 99 may be configured to manage one or more sub-modules, components, and/or services directed to examples disclosed herein. In some examples, the removal module 99 may include a sensor management component 402, an identification component 404, a grasping strategy component 406, a position component 408, a removal strategy component 410, and a control component 412. While these modules and components are illustrated in FIG. 4 and will be described as performing discrete tasks with reference to the flow charts, it is understood that FIG. 4 illustrates example configurations and other configurations performing other tasks and/or similar tasks as those described herein may be implemented according to the techniques described herein. Other module, components, or engines may perform the same tasks as the removal module 99 or other tasks and may be implemented in a similar or different fashion. The removal module 99 may be implemented within the controller 111, the management module 15, or in any other suitable arrangement (e.g., a server that provides the functions described with reference to the management module 15 that communicates with the controller 111 or provides instructions directly to the robotic arm 102).

The sensor management component 402 may be configured to manage the operation of one or more sensors described herein. This may include, for example, sensors that detect the inventory items 40 and/or attributes of the inventory items 40 and sensors associated with the robotic arm 102 that detect the inventory items 40 and/or attributes of the inventory items 40. The sensor management component 402 may also be configured to process sensing information, which may include optical information that describes optical aspects of the inventory items 40. In some examples, the sensor management component 402 may be configured to adjust, translate, or otherwise process the optical information to derive other information from optical information.

The identification component 404 may be configured to identify one or more inventory items 40 represented by sensing information or in any other suitable manner. For example, the identification component 404 may process one or more images in order to identify objects depicted in the one or more images and the relationships between the objects. The one or more images may be captured by the sensor package 121. The objects may include the inventory items 40, a portion of the inventory conveyance system 104, and any other suitable object which may be identified in implementing the techniques described herein. As part of identifying the inventory items 40, the identification component 404 may identify attributes of the inventory items 40 which may be compared to records for the inventory items 40. In this manner, the identification component 404 may be used to identify the inventory items 40.

The grasping strategy component 406 may be configured to determine grasping strategies for grasping the inventory items 40. For example, a grasping strategy may depend on an orientation of a particular inventory item 40 and attributes of the particular inventory item 40. The grasping strategy component 406 may be configured to determine such strategies. In some examples, grasping strategies may be pre-computed and stored in a database (e.g., the grasp database 114). A grasping strategy may indicate an orientation of the end effector 106 and other components of the robotic arm 102 for grasping the particular inventory item 40. The grasping strategy may also indicate a force to be applied by the end effector 106 in order to grasp the particular inventory item 40. This force may be sufficient to lift the particular inventory item 40 at a particular rate. For example, because the particular inventory item 40 will be moving on the inventory conveyance system 104, the particular inventory item 40 may have to be removed quickly in order to avoid collisions with other inventory items 40. Thus, a greater force may be desired to counter the dynamic forces that will be exerted on the particular inventory item 40 as it is grasped and removed. In some examples, the grasping strategy may indicate a particular type of end effector to use to remove the particular inventory item 40.

A grasping strategy can include any information regarding the manner in which a robotic arm 102 is to attempt to grasp the particular item 40 or group of items. For example, a grasping strategy may include an indication of one or more end effectors to be utilized by the robotic arm, and/or an indication of a level of intensity (e.g., amount of force, pressure, voltage, current, etc.) with which the robotic arm is to operate the end effector(s). In some examples, the grasping strategy may also include a number of items to be simultaneously grasped.

As to end effectors identified in a grasping strategy, the robotic arm 102 may include one or more end effectors and may be capable of utilizing multiple end effectors in conjunction with one another or as alternatives to one another. As illustrative examples, a grasping strategy may call for a number of different robotic arms each having different end effectors or combinations of end effectors, or a grasping strategy may involve activating a combination of end effectors available on a single robotic arm. Any suitable end effector (or number or combination of end effectors) may be utilized, including, but not limited to, soft robotic effectors, vacuum effectors, electro-adhesion effectors, and mechanical or electromechanical effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferro-magnetic particles capable of altering a size or shape of the fluid volume when subjected to a magnetic field). Vacuum end effectors may grasp items using suction. Electro-adhesion end effectors can include an array of electrodes arranged along a flexible or rigid substrate capable of applying a charge (akin to static electricity) that can adhere an item to the substrate portions that are in contact with the item. Mechanical or electromechanical end effectors may include pinchers, claws, grippers, or other rigid components that may be actuated relative to one another for grasping an item. Other end effectors may also be utilized to facilitate additional grasping techniques, such as for example, trays, scoops or other platforms or surfaces. For example, a magnetic or electromagnetic end effector may be useful for grasping items having ferro-magnetic materials.

A grasping strategy can also include an indication of a level of intensity with which the robotic arm 102 is to operate a specific end effector. For example, for a mechanical or electromechanical pincher, a grasping strategy may include an amount of force (e.g., a fixed level or a varying profile) that the pincher is to exert during the grasping operation. Intensity corollaries for other end effectors may include amount of suction for vacuum end effectors, strength of magnetic fields for magnetic or electromagnetic end effectors, current or charge exerted in an electro-adhesion end effector, or level of air pressure exerted to actuate a soft robotic end effector.

The position component 408 may be configured to determine a position of the particular inventory item 40 based on sensing information. The position may be relative to other components of the inventory conveyance system 104, the robotic arm 102, the sensor package 121, or any other component described herein. For example, the position of the particular inventory item 40 may be defined in terms of a location with respect to the moving surface 118. The position may therefore correspond to time. For example, at a first time, the position may have a first value with respect to the robotic arm 102 (e.g., 10 meters), and at a second time, the position may have a second value with respect to the robotic arm 102 (e.g., 5 meters). This may indicate that the particular inventory item 40 is moving toward the robotic arm 102. In some examples, the position of the particular inventory item 40 may be used to determine when the particular inventory item 40 will be near the robotic arm 102. In this manner, the position may be used to determine a plan for removing the particular inventory item 40. In some examples, the position may be determined from optical information that identifies a location of the particular inventory item 40 at a particular time (e.g., an image that includes time stamp information). In some examples, the position may be determined by using optical information that includes the particular inventory item 40 and a portion of the moving surface 118 that includes a marking pattern. As described herein, the marking pattern may indicate an absolute location along the moving surface. In some examples, as also described herein, the position may be determined by reading one or more machine-readable tags or identifiers disposed along the moving surface 118.

The position component 408 may also be configured to determine an orientation of the particular inventory item 40 with respect to the moving surface 118. For example, the moving surface 118 may include a marking pattern applied thereon that can used by the position component 408 to determine an orientation of the particular inventory item 40 with respect to the marking pattern. For example, the orientation may indicate how the particular inventory item 40 is oriented with respect to a grid of intersecting lines (e.g., a marking pattern). Later, the robotic arm 102 (e.g., via instructions from the controller 111, the removal module 99, and/or the management module 15) may search for a similar orientation of the particular inventory item 40 with respect to the grid as part of grasping and removing the particular inventory item 40.

The removal strategy component 410 may be configured to utilize information from any suitable source to determine a removal strategy for the particular inventory item 40. For example, the removal strategy component 410 may determine the removal strategy based at least in part on the position of the particular inventory item 40, the orientation of the particular inventory item 40, the movement rate of the inventory conveyance system 104, an identity of the particular inventory item 40, including characteristics of the particular inventory item 40, and/or any other suitable information. The removal strategy may include a depiction of the conditions in which the particular inventory item 40 should be found. The depiction may include an optical representation of the conditions (e.g., an image that depicts the particular inventory item 40, its orientation with respect to the marking pattern, and any other inventory items 40 adjacent the inventory item 40). In some examples, the conditions may be initial conditions existing when the particular inventory item 40 was scanned by the sensor package 121. Alternatively, the conditions may be altered from the initial conditions. For example, if one or more adjacent inventory items 40 have been removed prior to the particular inventory item 40 being removed, the optical representation may depict such changes in conditions (e.g., the absence of certain inventory items which should have been removed). Such depictions of initial conditions and current conditions may be used by the robotic arm 102 (e.g., via instructions from the controller 111, the removal module 99, and/or the management module 15) to assess whether the removal strategy is still sound.

In practice, a removal strategy may include a trajectory according to which the robotic arm 102 may travel to approach the particular inventory item 40, grasp the particular inventory item 40, and move away from the location where the particular inventory item 40 was previously located. The trajectory may be defined as a path that includes a direction from which the robotic arm 102 is to approach the particular item 40 (e.g., from above, from a side, from an angle) and/or a sequence of motions by which the robotic arm 102 is to perform a particular removal operation, which may include reaching the particular item 40, grasping the particular item 40, moving the particular item 40 to a target location, and/or releasing the particular item 40 at a target location. The trajectory may also indicate a beginning orientation of the robotic arm 102 from which the robotic arm 102 may begin its approach to the particular inventory item 40. Other orientations of the robotic arm 102 may also be included in the removal strategy. These other orientations include, for example, intermediate orientations, a grasping orientation, and a final orientation.

In some examples, the removal strategy component 410 may be configured to utilize information from any suitable source to determine a placement strategy for a particular inventory item 40. For example, the removal strategy component 410 may determine the placement strategy based at least in part on an available area on a moving surface of the inventory conveyance system 104, a position of the available area with respect to the robotic arm 102, a desired orientation of the particular item 40 with respect to the available area (or other items 104 adjacent the available area), a movement rate of the inventory conveyance system 104, an identity of the particular inventory item 40, including characteristics of the particular inventory item 40, a retrieval location of the particular inventory item 40 (e.g., a particular inventory holder 30), and/or any other suitable information.

The control component 412 may be configured to execute the removal strategy. In some examples, this may include generating a set of instructions for operating the robotic arm 102 to execute the grasping strategy and/or the removal strategy.

In general, the resource scheduling module 92, the route planning module 94, the segment reservation module 96, the inventory module 97, the removal module 99, and the communication interface module 98 may each represent any appropriate hardware and/or software suitable to provide the described functionality. In addition, as noted above, the management module 15 may, in particular embodiments, represent multiple different discrete components and any or all of the resource scheduling module 92, the route planning module 94, the segment reservation module 96, the inventory module 97, and the removal module 99, and the communication interface module 98 may represent components physically separate from the remaining elements of the management module 15. Moreover, any two or more of the resource scheduling module 92, the route planning module 94, the segment reservation module 96, the inventory module 97, the removal module 99, and the communication interface module 98 may share common components. For example, in particular embodiments, the resource scheduling module 92, the route planning module 94, the segment reservation module 96, the inventory module 97, and the removal module 99 represent computer processes executing on the processor 90 and the communication interface module 98 comprises a wireless transmitter, a wireless receiver, and a related computer process executing on the processor 90.

Figure 5:
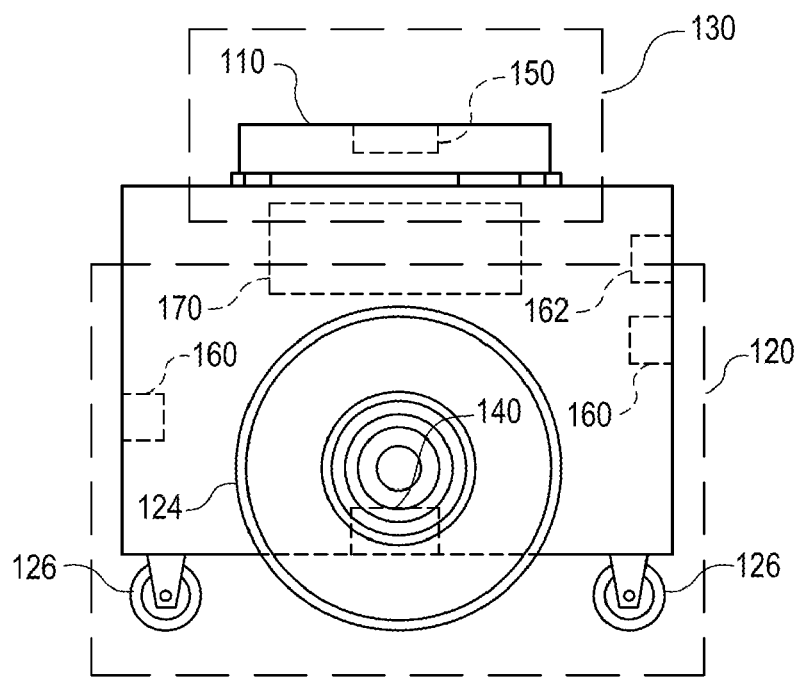
FIGS. 5 and 6 illustrate in greater detail an example mobile drive unit that may be utilized to implement techniques relating to removal of items from moving surfaces by robotic manipulators as described herein, according to at least one embodiment.
Figure 6:
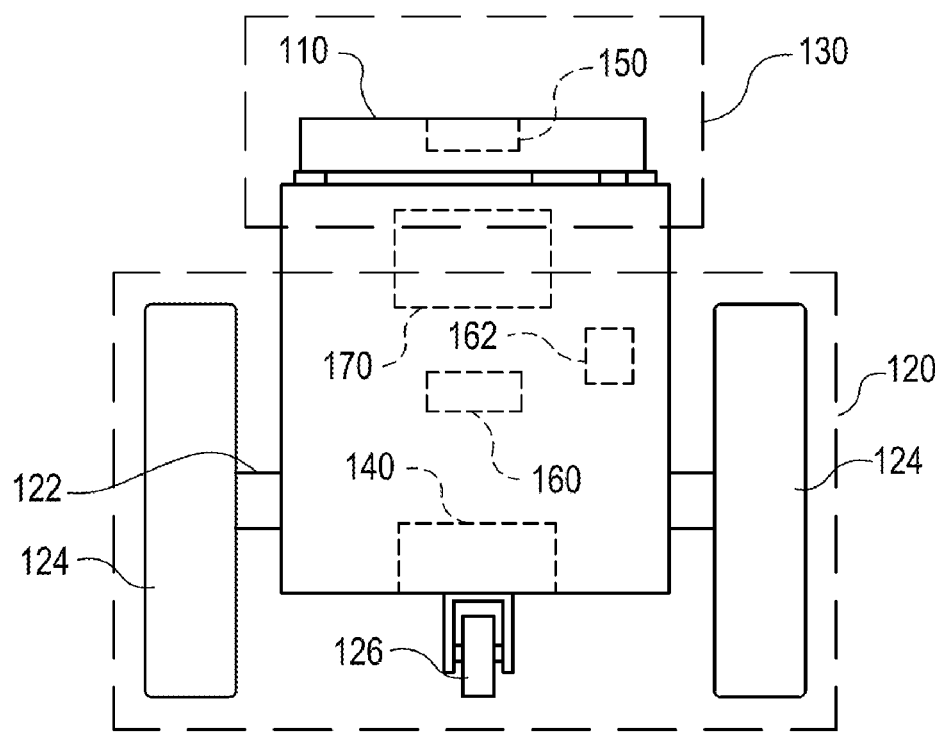

FIGS. 5 and 6 illustrate in greater detail the components of a particular embodiment of the mobile drive unit 20. In particular, FIGS. 5 and 6 include a side and front view of an example mobile drive unit 20. The mobile drive unit 20 includes a platform 110, a drive module 120, a docking head assembly 130, and a control module 170. The platform 110 may be considered a docking head. The docking head assembly 130 may be an actuator configured to move the platform 110 to engage with the inventory holder 30. Additionally, the mobile drive unit 20 may include one or more sensors configured to detect or determine the location of the mobile drive unit 20, the inventory holder 30, and/or other appropriate elements of the inventory system 10. In the illustrated embodiment, the mobile drive unit 20 includes a position sensor 140, a holder sensor 150, an obstacle sensor 160, and an identification signal transmitter 162.

The platform 110, in particular embodiments of the mobile drive unit 20, couples the mobile drive unit 20 to the inventory holder 30 and/or supports the inventory holder 30 when the mobile drive unit 20 is docked to the inventory holder 30. The platform 110 may additionally allow the mobile drive unit 20 to maneuver the inventory holder 30, such as by lifting the inventory holder 30, propelling the inventory holder 30, rotating the inventory holder 30, tilting the inventory holder 30, and/or moving the inventory holder 30 in any other appropriate manner. The platform 110 may also include any appropriate combination of components, such as ribs, spikes, and/or corrugations, to facilitate such manipulation of the inventory holder 30. For example, in particular embodiments, the platform 110 may include a high-friction portion that abuts a portion of the inventory holder 30 while the mobile drive unit 20 is docked to the inventory holder 30. In such embodiments, frictional forces created between the high-friction portion of the platform 110 and a surface of the inventory holder 30 may induce translational and rotational movement in the inventory holder 30 when the platform 110 moves and rotates, respectively. As a result, the mobile drive unit 20 may be able to manipulate the inventory holder 30 by moving or rotating the platform 110, either independently or as a part of the movement of the mobile drive unit 20 as a whole.

The drive module 120 propels the mobile drive unit 20 and, when the mobile drive unit 20 and the inventory holder 30 are docked, the inventory holder 30. The drive module 120 may represent any appropriate collection of components operable to propel the mobile drive unit 20. For example, in the illustrated embodiment, the drive module 120 includes a motorized axle 122, a pair of motorized wheels 124, and a pair of stabilizing wheels 126. One motorized wheel 124 is located at each end of the motorized axle 122, and one stabilizing wheel 126 is positioned at each end of the mobile drive unit 20.

The docking head assembly 130 moves the platform 110 towards the inventory holder 30 to facilitate docking of the mobile drive unit 20 and the inventory holder 30. The docking head assembly 130 may also be capable of adjusting the position or orientation of the platform 110 in other suitable manners to facilitate docking. The docking head assembly 130 may include any appropriate components, based on the configuration of the mobile drive unit 20 and the inventory holder 30, for moving the platform 110 or otherwise adjusting the position or orientation of the platform 110. For example, in the illustrated embodiment, the docking head assembly 130 includes a motorized shaft (not shown) attached to the center of the platform 110. The motorized shaft is operable to lift the platform 110 as appropriate for docking with the inventory holder 30.

The drive module 120 may be configured to propel the mobile drive unit 20 in any appropriate manner. For example, in the illustrated embodiment, the motorized wheels 124 are operable to rotate in a first direction to propel the mobile drive unit 20 in a forward direction. The motorized wheels 124 are also operable to rotate in a second direction to propel the mobile drive unit 20 in a backward direction. In the illustrated embodiment, the drive module 120 is also configured to rotate the mobile drive unit 20 by rotating the motorized wheels 124 in different directions from one another or by rotating the motorized wheels 124 at different speeds from one another.

The position sensor 140 represents one or more sensors, detectors, or other components suitable for determining the location of the mobile drive unit 20 in any appropriate manner. For example, in particular embodiments, the workspace 70 associated with the inventory system 10 includes a number of fiducial marks that mark points on a two-dimensional grid that covers all or a portion of the workspace 70. In such embodiments, the position sensor 140 may include a camera and suitable image- and/or video-processing components, such as an appropriately-programmed digital signal processor, to allow the position sensor 140 to detect fiducial marks within the camera's field of view. The control module 170 may store location information that the position sensor 140 updates as the position sensor 140 detects fiducial marks. As a result, the position sensor 140 may utilize fiducial marks to maintain an accurate indication of the location of the mobile drive unit 20 and to aid in navigation when moving within the workspace 70.

The holder sensor 150 represents one or more sensors, detectors, or other components suitable for detecting the inventory holder 30 and/or determining, in any appropriate manner, the location of the inventory holder 30, as an absolute location or as a position relative to the mobile drive unit 20. The holder sensor 150 may be capable of detecting the location of a particular portion of the inventory holder 30 or the inventory holder 30 as a whole. The mobile drive unit 20 may then use the detected information for docking with or otherwise interacting with the inventory holder 30.

The obstacle sensor 160 represents one or more sensors capable of detecting objects located in one or more different directions in which the mobile drive unit 20 is capable of moving. The obstacle sensor 160 may utilize any appropriate components and techniques, including optical, radar, sonar, pressure-sensing and/or other types of detection devices appropriate to detect objects located in the direction of travel of the mobile drive unit 20. In particular embodiments, the obstacle sensor 160 may transmit information describing objects it detects to the control module 170 to be used by the control module 170 to identify obstacles and to take appropriate remedial actions to prevent the mobile drive unit 20 from colliding with obstacles and/or other objects.

The obstacle sensor 160 may also detect signals transmitted by other mobile drive units 20 operating in the vicinity of the illustrated mobile drive unit 20. For example, in particular embodiments of the inventory system 10, one or more mobile drive units 20 may include an identification signal transmitter 162 that transmits a drive identification signal. The drive identification signal indicates to the other mobile drive units 20 that the object transmitting the drive identification signal is in fact a mobile drive unit. The identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, the obstacle sensor 160 may also be capable of detecting state information transmitted by the other mobile drive units 20. For example, in particular embodiments, the identification signal transmitter 162 may be capable of including state information relating to the mobile drive unit 20 in the transmitted identification signal. This state information may include, but is not limited to, the position, velocity, direction, and the braking capabilities of the transmitting mobile drive unit 20. In particular embodiments, the mobile drive unit 20 may use the state information transmitted by other mobile drive units to avoid collisions when operating in close proximity with those other mobile drive units.

The control module 170 monitors and/or controls operation of the drive module 120 and the docking head assembly 130. The control module 170 may also receive information from sensors such as the position sensor 140 and the holder sensor 150 and adjust the operation of the drive module 120, the docking head assembly 130, and/or other components of the mobile drive unit 20 based on this information. Additionally, in particular embodiments, the mobile drive unit 20 may be configured to communicate with a management device of the inventory system 10 and the control module 170 may receive commands transmitted to the mobile drive unit 20 and communicate information back to the management device utilizing appropriate communication components of the mobile drive unit 20. The control module 170 may include any appropriate hardware and/or software suitable to provide the described functionality. In particular embodiments, the control module 170 includes a general-purpose microprocessor programmed to provide the described functionality. Additionally, the control module 170 may include all or portions of the docking head assembly 130, the drive module 120, the position sensor 140, and/or the holder sensor 150, and/or share components with any of these elements of the mobile drive unit 20.

Moreover, in particular embodiments, the control module 170 may include hardware and software located in components that are physically distinct from the device that houses the drive module 120, the docking head assembly 130, and/or the other components of the mobile drive unit 20 described above. For example, in particular embodiments, each mobile drive unit 20 operating in the inventory system 10 may be associated with a software process (referred to here as a "drive agent") operating on a server that is in communication with the device that houses the drive module 120, the docking head assembly 130, and other appropriate components of the mobile drive unit 20. This drive agent may be responsible for requesting and receiving tasks, requesting and receiving routes, transmitting state information associated with the mobile drive unit 20, and/or otherwise interacting with the management module 15 and other components of the inventory system 10 on behalf of the device that physically houses the drive module 120, the docking head assembly 130, and the other appropriate components of the mobile drive unit 20. As a result, for the purposes of this description and the claims that follow, the term "mobile drive unit" includes software and/or hardware, such as agent processes, that provides the described functionality on behalf of the mobile drive unit 20 but that may be located in physically distinct devices from the drive module 120, the docking head assembly 130, and/or the other components of the mobile drive unit 20 described above.

While FIGS. 5 and 6 illustrate a particular embodiment of the mobile drive unit 20 containing certain components and configured to operate in a particular manner, the mobile drive unit 20 may represent any appropriate component and/or collection of components configured to transport and/or facilitate the transport of the inventory holders 30. As another example, the mobile drive unit 20 may represent part of an overhead crane system in which one or more crane assemblies are capable of moving within a network of wires or rails to a position suitable to dock with a particular inventory holder 30. After docking with the inventory holder 30, the crane assembly may then lift the inventory holder 30 and move inventory to another location for purposes of completing an assigned task.

Furthermore, in particular embodiments, the mobile drive unit 20 may represent all or a portion of the inventory holder 30. The inventory holder 30 may include motorized wheels or any other components suitable to allow the inventory holder 30 to propel itself. As one specific example, a portion of the inventory holder 30 may be responsive to magnetic fields. The inventory system 10 may be able to generate one or more controlled magnetic fields capable of propelling, maneuvering and/or otherwise controlling the position of the inventory holder 30 as a result of the responsive portion of the inventory holder 30. In such embodiments, the mobile drive unit 20 may represent the responsive portion of the inventory holder 30 and/or the components of the inventory system 10 responsible for generating and controlling these magnetic fields. While this description provides several specific examples, the mobile drive unit 20 may, in general, represent any appropriate component and/or collection of components configured to transport and/or facilitate the transport of the inventory holders 30.

Figure 7:
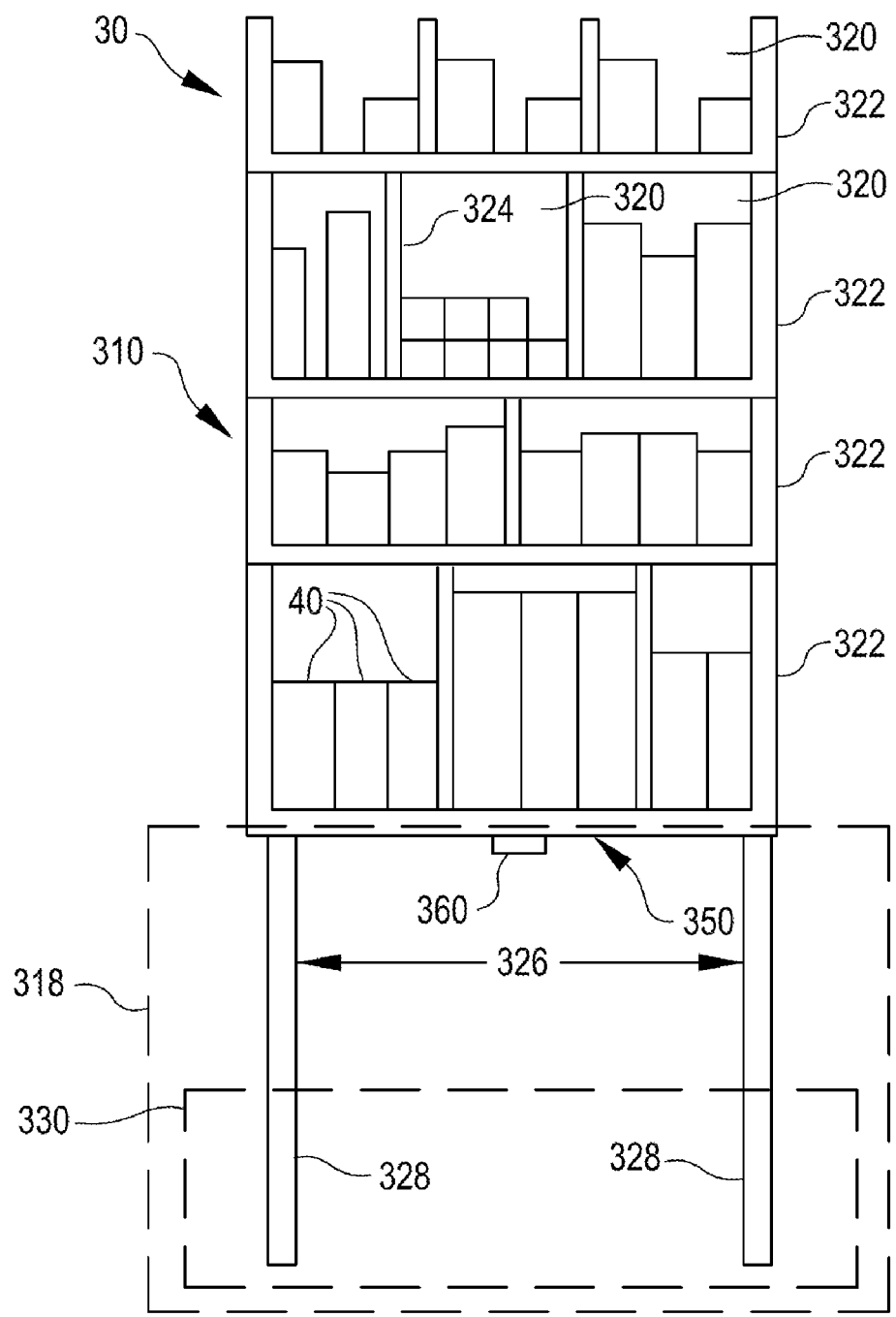
FIG. 7 illustrates in greater detail an example inventory holder that may be utilized to implement techniques relating to removal of items from moving surfaces by robotic manipulators as described herein, according to at least one embodiment.

FIG. 7 illustrates in greater detail the components of a particular embodiment of the inventory holder 30. In particular, FIG. 7 illustrates the structure and contents of one side of an example inventory holder 30. In a particular embodiment, the inventory holder 30 may comprise any number of faces with similar or different structure. As illustrated, the inventory holder 30 includes a frame 310, a plurality of legs 328, and a docking surface 350.

The frame 310 holds the inventory items 40. The frame 310 provides storage space for storing the inventory items 40 external or internal to the frame 310. The storage space provided by the frame 310 may be divided into a plurality of inventory bins 320, each capable of holding the inventory items 40. The inventory bins 320 may include any appropriate storage elements, such as bins, compartments, or hooks.

In a particular embodiment, the frame 310 is composed of a plurality of trays 322 stacked upon one another and attached to or stacked on a base 318. In such an embodiment, the inventory bins 320 may be formed by a plurality of adjustable dividers 324 that may be moved to resize one or more inventory bins 320. In alternative embodiments, the frame 310 may represent a single inventory bin 320 that includes a single tray 322 and no adjustable dividers 324. Additionally, in particular embodiments, the frame 310 may represent a load-bearing surface mounted on mobility element 330. The inventory items 40 may be stored on such an inventory holder 30 by being placed on the frame 310. In general, the frame 310 may include internal and/or external storage space divided into any appropriate number of the inventory bins 320 in any appropriate manner.

Additionally, in a particular embodiment, the frame 310 may include a plurality of device openings 326 that allow the mobile drive unit 20 to position the platform 110 adjacent the docking surface 350. The size, shape, and placement of the device openings 326 may be determined based on the size, the shape, and other characteristics of the particular embodiment of the mobile drive unit 20 and/or the inventory holder 30 utilized by the inventory system 10. For example, in the illustrated embodiment, the frame 310 includes four legs 328 that form the device openings 326 and allow the mobile drive unit 20 to position the mobile drive unit 20 under the frame 310 and adjacent to the docking surface 350. The length of the legs 328 may be determined based on a height of the mobile drive unit 20.

The docking surface 350 comprises a portion of the inventory holder 30 that couples to, abuts, and/or rests upon a portion of the platform 110, when the mobile drive unit 20 is docked to the inventory holder 30. Additionally, the docking surface 350 supports a portion or all of the weight of the inventory holder 30 while the inventory holder 30 is docked with the mobile drive unit 20. The composition, shape, and/or texture of the docking surface 350 may be designed to facilitate maneuvering of the inventory holder 30 by the mobile drive unit 20. For example, as noted above, in particular embodiments, the docking surface 350 may comprise a high-friction portion. When the mobile drive unit 20 and the inventory holder 30 are docked, frictional forces induced between the platform 110 and this high-friction portion may allow the mobile drive unit 20 to maneuver the inventory holder 30. Additionally, in particular embodiments, the docking surface 350 may include appropriate components suitable to receive a portion of the platform 110, couple the inventory holder 30 to the mobile drive unit 20, and/or facilitate control of the inventory holder 30 by the mobile drive unit 20.

Holder identifier 360 marks a predetermined portion of the inventory holder 30 and the mobile drive unit 20 may use the holder identifier 360 to align with the inventory holder 30 during docking and/or to determine the location of the inventory holder 30. More specifically, in particular embodiments, the mobile drive unit 20 may be equipped with components, such as the holder sensor 150, that can detect the holder identifier 360 and determine its location relative to the mobile drive unit 20. As a result, the mobile drive unit 20 may be able to determine the location of the inventory holder 30 as a whole. For example, in particular embodiments, the holder identifier 360 may represent a reflective marker that is positioned at a predetermined location on the inventory holder 30 and that the holder sensor 150 can optically detect using an appropriately-configured camera.

Depending on the configuration and characteristics of the mobile drive unit 20 and the inventory system 10, the mobile drive unit 20 may move the inventory holder 30 using a variety of appropriate methods. In a particular embodiment, the mobile drive unit 20 is capable of moving the inventory holder 30 along a two-dimensional grid, combining movement along straight-line segments with ninety-degree rotations and arcing paths to transport the inventory holder 30 from the first location to the second location. Additionally, while moving, the mobile drive unit 20 may use fixed objects located in the workspace as reference points to assist in navigation. For example, in particular embodiments, the inventory system 10 includes multiple fiducial marks. The mobile drive unit 20 may be configured to detect the fiducial marks and to determine the location of the mobile drive unit 20 and/or measure its movement based on the detection of the fiducial marks.

After the mobile drive unit 20 arrives at the second location, the mobile drive unit 20 may perform appropriate operations to facilitate access to inventory items 40 stored in the inventory holder 30. For example, the mobile drive unit 20 may rotate the inventory holder 30 to present a particular face of the inventory holder 30 to an operator of the inventory system 10 or other suitable party, such as a packer selecting the inventory items 40 from the inventory holder 30. The mobile drive unit 20 may also undock from the inventory holder 30. Alternatively, instead of undocking at the second location, the mobile drive unit 20 may transport the inventory holder 30 back to the first location or to a third location after any appropriate actions have been taken involving the inventory items 40. For example, after a packer has removed particular inventory items 40 from the inventory holder 30, the mobile drive unit 20 may return the inventory holder 30 to its original storage location, a new storage location, or another inventory station. The mobile drive unit 20 may then undock from inventory holder 30 at this new location.

Figure 8:
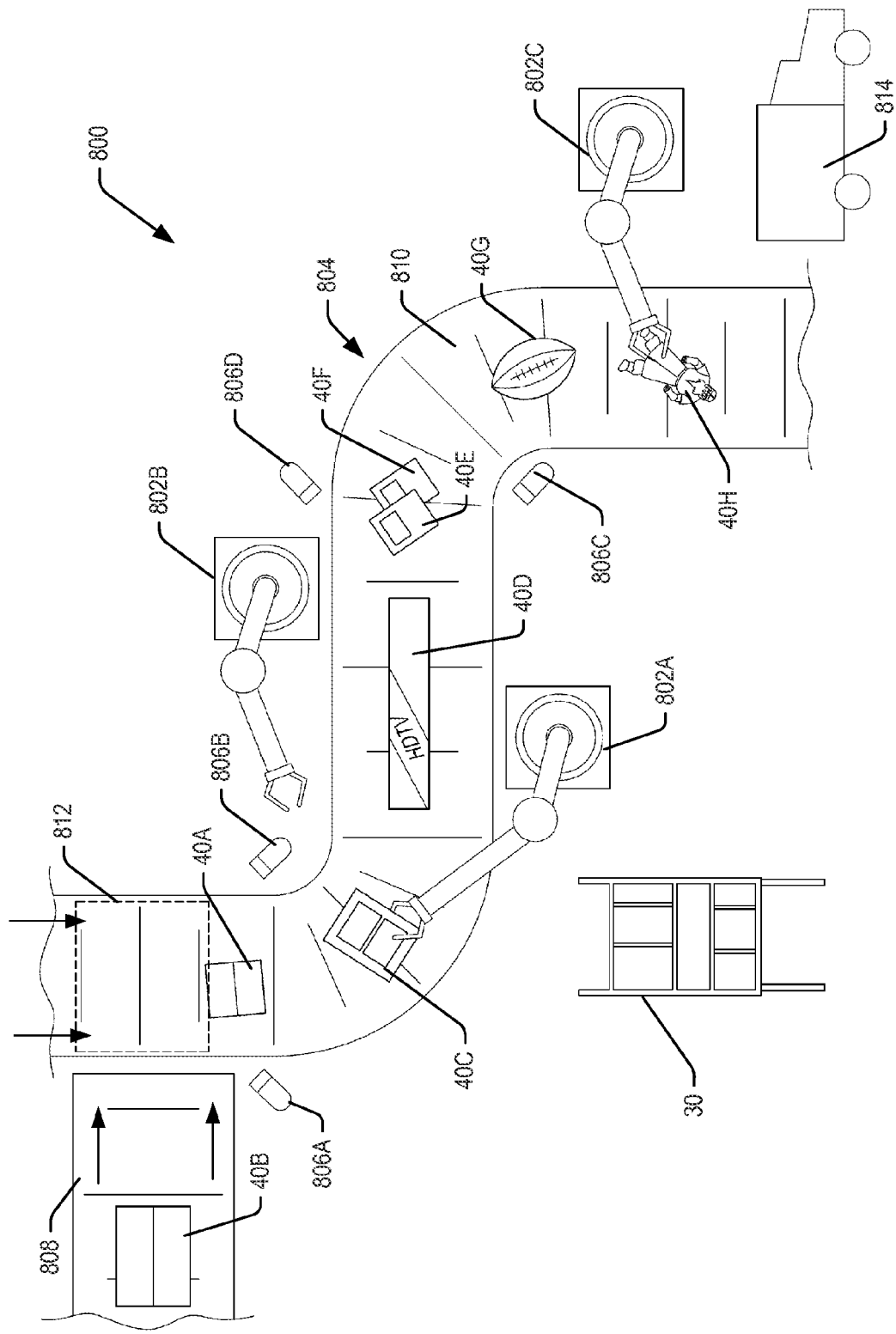
FIG. 8 illustrates a diagram depicting a plurality of robotic manipulators and an inventory conveyance system which may be used to implement techniques relating to removal of items from moving surfaces by robotic manipulators as described herein, according to at least one embodiment.

As introduced above, embodiments herein are directed to an inventory system having multiple inventory holders and drive units for moving the inventory holders. In particular, features herein are directed to robotic arms or manipulators and associated components that may facilitate the movement of inventory items from inventory conveyance systems. Such movement may include movement of inventory items from moving surfaces of inventory conveyance systems. For example, FIG. 8 illustrates an example inventory system 800 depicting techniques relating to removal of items from moving surfaces by robotic manipulators. To this end, the inventory system 800 may include one or more robotic arms 802A-802C, an inventory conveyance system 804, and one or more sensors 806A-806D. The robotic arms 802A-802C are examples of the robotic arms 102 discussed with reference to FIG. 1. Similarly, the inventory conveyance system 804 and the one or more sensors 806A-806D are examples of the inventory conveyance system 104 and sensors 123A and 123B (part of the sensor package 121) respectively discussed with reference to FIG. 1. The sensors 806A-806D may be any suitable sensor configured to detect the inventory items 40 and/or attributes of the inventory items 40. In some examples, at least some of the sensors 806A-806D are optical sensors such as, for example, still-frame cameras, video cameras, infrared detectors, bar code scanners, and any other suitable optical sensors. Thus, in some examples, at least some of the sensors 806A-806D capture images depicting the inventory items 40. In some examples, the images may depict a three-dimensional representation of each inventory item 40 and the conditions surrounding each inventory item 40.

The inventory conveyance system 804 may include a first moving surface 808 and a second moving surface 810. In some examples, the first moving surface 808 and the second moving surface 810 may move in the direction of the arrows illustrated on the respective moving surfaces. The first moving surface 808 and the second moving surface 810 are examples of moving conveyor belts, which may be belts constructed of any suitable material or series of rollers, which may be constructed of any suitable material. The moving surfaces 808 and 810 may have any suitable cross-sectional shape taken in the width direction (i.e., a cross section taken perpendicular to the direction of travel). For example, the moving surfaces 808 and 810 may have a substantially flat cross section, a bowl-shaped concave-up cross section, a trapezoidal concave-up cross section, or any other suitable cross-sectional shape capable of carrying the inventory items 40. The moving surfaces 808 and 810 may be configured to follow any suitable path, which may include curved sections, straight sections, tapered sections, and any other type of section, each of which may be aligned vertically, horizontally, or according to some angle between horizontal and vertical. For example, the second moving surface 810 may be a continuous loop including horizontal curved sections and horizontal straight sections that moves throughout a workspace. In this manner, items may be placed on the second moving surface 810 and removed from the second moving surface 810 when appropriate. This may enable efficient movement of inventory because item removal may be more time intensive than item loading. Thus, the second moving surface 810 may act as a buffer for removal of items.

The inventory conveyance system 804 may include a conveyance module configured to control its operation. In some examples, the inventory conveyance system 804 is controlled by an inventory management system communicating with the conveyance module, which may be associated with the management module 15. In any event, the conveyance module may be any suitable combination of hardware and/or software configured to manage the operation of the actuators or motors which drive the inventory conveyance system 804 and other components of the inventory conveyance system 804. This may include setting and adjusting a movement rate at which the moving surfaces 808 and 810 move. This movement rate may be expressed in terms of speed, cycles, or other unit of measure. In some examples, information identifying the movement rate may be shared with the removal module 99 and any other suitable module in order to implement the techniques described herein. For example, the removal module 99 may periodically request the movement rate, or may have continuous or real-time access to the movement rate via an output mechanism (e.g., a gauge, meter, or other sensor). In some examples, the removal module 99 may determine the movement rate based on information collected from the second moving surface 810. For example, at a first time, a first image may be captured by the sensor 806A of a portion of the second moving surface 810. At a later time, a second image may be captured by the sensor 806D of the same portion of the second moving surface 810. Because the distance between the sensor 806A and the sensor 806D is known and the time between capture of the two images is known, the movement rate may be determined using conventional methods.

In some examples, the first moving surface 808 may be configured to move the inventory items 40 onto the second moving surface 810. The first moving surface 808, for example, may include inbound inventory items 40 loaded at a decanting area and being moved to the second moving surface 810 where the inbound inventory items 40 can be removed from second moving surface 810 by one of the robotic arms 802. For example, as described herein, the inventory item 40B may move along the first moving surface 808 toward the second moving surface 810 and, ultimately, be transferred to the second moving surface 810.

The inventory conveyance system 804 may be configured to carry inventory items 40 of various dimensions and types. For example, the inventory item 40B is an example of a large boxed item ("the large-boxed item 40B"), the inventory item 40A is an example of a small-boxed item ("the small-boxed item 40A"), the inventory item 40C is an example of a packaged consumer electronic device ("the electronic device 40C"), the inventory item 40D is an example of an HDTV ("the HDTV 40D"), the inventory items 40E and 40F are examples of books ("a first book 40E" and "a second book 40F"), the inventory item 40G is an example of a football ("the football 40G"), and the inventory item 40H is an example of a dwarf figurine ("the dwarf 40H"). In some examples, the inventory items 40A-40H are placed on the inventory conveyance system 804 without regard to any order. Thus, the inventory items 40A-40H may be placed randomly or semi-randomly. This may be a result of the loading process in which received items are loaded onto the inventory conveyance system 804. In this example, the spacing between the inventory items 40A-40H may be random based on how they were loaded.

In some examples, the inventory items 40A-40H and other inventory items 40 are placed on the inventory conveyance system 804 with respect to an order, which may consider the position and/or orientation of the inventory items 40A-40H with respect to the inventory conveyance system 804, any relatedness of items, removability of items compared to surrounding items, and any other suitable characteristic. Instructions related to position and/or orientation, relatedness, and removability for placement of items may be provided to one or more automated or human operators. For example, one or more other robotic operators may be tasked with placing the inventory items 40A-40H on the inventory conveyance system 804. These other robotic operators may receive placement instructions, e.g., from the controller 111, the removal module 99, and/or the management module 15.

Regarding a position and/or orientation instruction, in some examples, a particular position and/or orientation of each of the inventory items 40A-40H may enable easier removal of the items by one of the robotic arms 802. Thus, the position and/or orientation instruction may indicate desired positions and/or orientations for the inventory items 40A-40H.

Regarding a relatedness instruction, in some examples, relationships between some inventory items 40A-40H may be identified and the placement instructions may consider these relationships. For example, if two items are part of the same order, they may be placed in a manner that would enable the same robotic arm 802 to collect the two inventory items. This may mean that the two items are not placed directly next to each other, but instead that a suitable distance is maintained between them such that the robotic arm 802 will have time to collect the first inventory item 40 and place it at a drop location prior to the second inventory item 40 arriving at the robotic arm 802. The relationship may also indicate that certain inventory items 40 are usually grouped together, either as part of an order or as part of an inventory management/storage plan. Thus, these inventory items 40 may be placed on the inventory conveyance system 804 in a manner that enables their retrieval by the same robotic arm 802.

Regarding a removability instruction, in some examples, the dimensions of certain inventory items 40A-40H may be considered. For example, smaller items may not be placed between two larger items. Such a placement may make it difficult to remove the smaller items because the larger items would block an approach of the robotic arm 102.

Removal of the inventory items 40 may be orchestrated in a manner that is considerate of future demand for the inventory items 40. For example, certain inventory items 40, for which there exists an immediate demand, may be removed and placed at a first location. Inventory items 40 with similar demands may also be placed at the first location or at some other location.

The removal of inventory items may also depend on a customer order having been received. For example, a customer order for a particular inventory item 40 may be received by an electronic marketplace. Based on the order, an inventory management system (which may be associated with the management module 15 and/or the electronic marketplace) may monitor the inventory items 40 being carried by the inventory conveyance system 804. Once the particular inventory item 40 is detected by one of the sensors 806, a removal strategy may be determined that indicates a placement location of the particular inventory item 40. The placement location may be within an inventory holder 30 such as illustrated in FIG. 8. The inventory holder 30, in this example, may be a location where inventory items 40 that are identified to fulfill customer orders are placed.

The moving surfaces 808 and 810 of the inventory conveyance system 804 may include a marking pattern, a portion of which is illustrated within a window 812. Examples of marking patterns that may correspond to the window will be discussed in detail with reference to FIGS. 9-13. Generally, the marking pattern may be used by the removal module 99 to determine a position of one of the inventory items 40A-40H with respect other components of the inventory system 800. For example, the marking pattern may be used to determine a position of the small-boxed item 40A with respect to the robotic arm 802B. In some examples, the marking pattern may be used to determine an absolute position of the small-boxed item 40A along the second moving surface 810. The absolute position may be associated with some identifier of the marking pattern. For example, if the marking pattern were a series of sequential numbers from 1 to 200, an absolute location of the small-boxed item 40A may be indicated as number 55 along the series of sequential numbers from 1 to 200.

The marking pattern may also be used by the removal module 99 to determine orientations of the inventory items 40A-40H. For example, because the marking pattern may include shapes, lines, intersections, grids, numbers, letters, symbols, and/or other graphical or non-graphical elements, when the sensors 806A-806D capture one or more images of the small-boxed item 40A, the one or more images may depict an orientation of the small-boxed item 40A with respect to the marking pattern and may also depict one or more other inventory items 40, which may be located adjacent the small-boxed item 40A. This orientation may be considered an initial orientation of the small-boxed item 40A. The depiction, including the initial orientation, may be provided directly to one of the robotic arms 802 and/or to the removal module 99 to be used as part of determining a removal strategy for removing the small-boxed item 40A. In some examples, the initial orientation may change prior to the small-boxed item 40A arriving at one of the robotic arms 802. This may be due to adjacent items being removed between when the initial orientation was captured (e.g., when the small-boxed item 40A passed by the sensors 806A and 806B) and when the small-boxed item 40A arrives at one of the robotic arms 802 (e.g., when the small-boxed item 40A arrives at the robotic arm 802B). This may also be due to the small-boxed item 40A shifting on the second moving surface 810. For example, the small-boxed item 40A may be placed on a first side, but as it moves along the second moving surface 810, it may bounce or fall over to a second side. This may affect the orientation (and possibly the position) identified in the removal strategy.

The removal module 99 may also generate a removal task, which may be included in the removal strategy. The removal task may be assigned to one of the robotic arms 802 which is expected to remove a particular inventory item 40. If the assigned robotic arm 802 is unable to execute the removal strategy, it may send a notification to the removal module 99 that, in response, may reassign the removal task to a different robotic arm 802. The assigned robotic arm 802 may be unable to execute the removal strategy because of any number of factors including, for example, shifting of the inventory items 40 causing present conditions different than those determined in the removal strategy, prior removal of the subject inventory item 40 by a different robotic arm 802, incapability of removal, or any other factor.

In some examples, the robotic arms 802A-802C may be any suitable robotic manipulator configured to grasp inventory items 40 and capable of operating in at least three dimensions. The robotic arms 802A-802C may each include an optical sensor configured to collect optical information describing objects within its field of view. This optical information may be used by each robotic arm 802A-802C to identify a particular item 40 (i.e., the conditions in which the particular item should exist as indicated in the removal strategy) in order to execute the removal strategy to remove the particular item. In some examples, the robotic arms 802A-802C may each include a controller configured to control the operation of the components. In some examples, the controller generates instructions based on the removal strategy. In some examples, the controller receives instructions from the removal module 99 for executing the removal strategy and executes the instructions in order to execute the removal strategy. In some examples, the robotic arms 802A-802C are fixedly mounted near the inventory conveyance system 804. In some examples, the robotic arms 802A-802C are mobile. For example, the robotic arms 802A-802C may be coupled, whether detachably or not, to mobile drive units 20 or other comparable drive units. In this manner, the robotic arms 802A-802C may be moveable with respect to the inventory conveyance system 804. This may enable the robotic arms 802A-802C to be moved to different locations along the second moving surface 810 in order to remove the inventory items 40. The robotic arms 802A-802C may be configured to remove the inventory items 40 and place them at any suitable location. For example, the robotic arm 802A is illustrated as placing the inventory items 40 in a particular inventory holder 30. The robotic arm 802C is illustrated as placing the inventory items 40 within a transport vehicle 814. In some examples, grasping, removal, and placement of a particular inventory item 40 may each constitute a particular inventory event that can reported back to an inventory management system. In some examples, only the placement is reported back to the inventory management system. This may avoid a human operator operating a button indicating that the particular inventory item 40 has been placed.

In some examples, certain robotic arms 802 may be more suitable for removing certain inventory items 40 than others. This may be because of the location of the robotic arm 802 with respect to the inventory conveyance system 804, because of the end effector used by the robotic arm 802, because of capabilities of the robotic arm 802, and/or because of the type, position and/or orientation of the items 40. Thus, the removal module 99 may assign a removal task to a particular robotic arm 802 (e.g., the robotic arm 802A), to a particular class of robotic arms 802 based on location (e.g., either of the robotic arms 802B and 802C which are on the same side of the second moving surface 810), or to a particular class of robotic arms 802 based on end effectors or capabilities (e.g., any of the robotic arms 802A-802C, which each have the same type of end effector).

In some examples, determining a removal strategy for the HDTV 40D may begin with one of the sensors 806A or 806B capturing optical information describing the HDTV 40D. This optical information may describe the HDTV 40D, a portion of the second moving surface 810 surrounding the HDTV 40D, and other adjacent inventory items (e.g., the electronic device 40C and/or the books 40E and 40F). The removal module 99 may access the optical information and use it to detect the HDTV 40D to be removed and any attributes of the HDTV 40D. In some examples, the detected attributes are used to determine the removal strategy. In some examples, a set of characteristics corresponding to the HDTV 40D may be identified from a database. The set of characteristics may correspond to at least some of the detected attributes and may include dimensions, weight, packaging characteristics, grasp instructions, and the like. The identity of the HDTV 40D, its position as described herein, its orientation as described herein, and/or other characteristics, whether detected by the sensors 806A and 806B or determined from the database, may be used to determine the removal strategy.

In some examples, optical information collected by the sensors 806A-806D may be used to determine any dependencies between inventory items 40. For example, the first book 40E and the second book 40F may be considered to have a dependency between them. This may be because removal of the second book 40F may be difficult, if not impossible, without also contacting the first book 40E. The removal module 99 may consider such dependencies as it determines a removal strategy for removing the second book 40F. A simple solution may be present when the first book 40E and the second book 40F are the same book. Thus, the removal module 99 may determine that the first book 40E may be removed first and the second book 40F may be removed second. This may minimize the effect of the dependency between the two books 40E and 40F. In some examples, a dependency may be determined even where inventory items are not in contact. For example, when an earlier large inventory item (e.g., the HDTV 40D) crowds the space of a later smaller inventory item (e.g., the electronic device 40C), a dependency may be present. This particular type of dependency may affect the approach that the robotic arm 802A can take to remove the electronic device 40C. If the dependency is quite severe, the removal strategy for the electronic device 40C may indicate that the electronic device 40C may be removed only after the HDTV 40D has been removed. Thus, even though the electronic device 40C may pass by the robotic arm 802A, the robotic arm 802A may allow the electronic device 40C to take another lap around the second moving surface 810 until it returns a second time. At this second time, execution of the removal strategy may be possible because the HDTV 40D perhaps will have been removed.

In some examples, especially for generic items (e.g., the first book 40E and the second book 40F), the removal strategy for a book of the same type as the first book 40E or the second book 40F may indicate that the first robotic arm 802 to detect the book should remove the book. This may enable quicker removal of generic items.

In some examples, the removal module 99 waits to determine the removal strategy until inventory items 40 are stable. For example, this may include allowing the HDTV 40D to move on the second moving surface 810 for a certain period of time, or for a certain number of cycles. This may ensure that the HDTV 40D has come to a stable position. The stable position may be one in which the HDTV 40D has not moved for a certain number of cycles, as indicated by the sensors 806A-806D, or is not likely to move (e.g., it is oriented with its largest side lying down on the second moving surface 810). In some examples, the removal module 99 may determine that an item is not removable because it continues to move and/or will not come to a resting position. For example, the football 40G is an example of an inventory item that may continue to roll on the moving surface 810. To this end, the removal module 99 may generate an instruction that the football 40G be removed by some means other than one of the robotic arms 802 (e.g., by a human operator).

In some examples, two or more robotic arms 802 may be instructed to execute a removal strategy. For example, this may include two or more robotic arms 802 working together to remove a particular inventory item 40. With reference to the HDTV 40D, the HDTV 40 may be a type of inventory item that would benefit from coordination between two or more robotic arms 802 when removing the HDTV 40D. Whether to use a single robotic arm 802 or two or more robotic arms 802 may depend, at least in part, on characteristics of the HDTV 40D (e.g., surface characteristics of packaging, a mass of the HDTV 40D, a center of gravity of the HDTV 40D, and any other suitable characteristic), an orientation of the HDTV 40D on the moving surface 810, proximity of two or more robotic arms 802, and any other suitable information. In some examples, the removal strategy may be provided to each of the two or more robotic arms 802 and/or to a single robotic arm 802 that may include one or more subordinate robotic arms 802.

Techniques described herein (e.g., with reference to FIG. 8) may also be applied to determining a placement strategy based at least in part on an identity of an inventory item 40, characteristics of the inventory item 40, a retrieval location of the inventory item 40, an available area on the moving surface 810, a movement rate of the inventory conveyance system 804, and/or any other suitable information. The placement strategy may include a strategy for grasping the inventory item 40, a beginning orientation for the robotic arm 102 to move to prior to approaching the inventory conveyance system 804, and a trajectory for the robotic arm 102 to follow.

For example, with reference to the dwarf 40H, in FIG. 8, the robotic arm 802C' may be in the process of retrieving the dwarf 40H from the transport vehicle 814 and placing the dwarf 40H onto the moving surface 810 in accordance with a placement strategy. To determine the placement strategy, an optical sensor (e.g., the sensor 108) associated with the robotic arm 802C may collect sensing information of an area within the transport vehicle 814 where the dwarf 40H was located. Using the sensing information, a retrieval location of the dwarf 40H within the transport vehicle 814 may be determined. Also using the sensing information, the dwarf 40H may be identified from among other inventory items 40 at or around the retrieval locations. Once the dwarf 40H has been identified, a set of characteristics corresponding to the dwarf 40H may be accessed or determined in accordance with techniques described herein. These characteristics may be used to determine an appropriate manner for grasping and retrieving the dwarf 40H from the transport vehicle 814.

One of the sensors 806 may also collect other sensing information that can be used to identify one or more available areas on the moving surface 810. The one or more available areas may be areas on the moving surface where the dwarf 40H may be placed on the moving surface 810 by the robotic arm 802C. In some examples, determining a particular available area may depend on the set of characteristics of the dwarf 40H. For example, the available area may have to be large enough to accommodate the dwarf 40H. In some examples, the available area considers other inventory items 40 that are adjacent to the available area for the dwarf 40H. This may be desirable in order to generate the placement strategy in a manner that does not contact or otherwise hinder placement/removal of the other inventory items 40.

In some examples, determination of removal strategies and placement strategies may be performed in a manner that is coordinated. For example, as the inventory conveyance system 804 moves continuously throughout a warehouse, the removal module 99 may determine placement strategies and removal strategies for items in a manner that considers future removals and future placements. For example, at a first time, a first inventory item 40 may be located at a first location on the moving surface 810. Nevertheless, because the removal module 99 may know that first inventory item 40 is planned to be removed, the removal strategy 99 may, also at the first time, determine a placement strategy for placement of a second inventory item 40 at the first location at a second, later time. In some examples, certain areas of the moving surface 810 may be reserved for future placements. For example, for a particular large inventory item 40, the removal module 99 may function to reserve an area of the moving surface 810, adjacent areas, and/or air space around the adjacent areas such that the large inventory item 40 can be placed without contacting other inventory items 40.

Turning now to marking patterns, FIGS. 9-13 illustrate example configurations of marking patterns that may be applied to moving surfaces in order to implement the techniques described herein. In some examples, any of the marking patterns described with reference to FIGS. 9-13 may function as fiducial indicators to indicate particular locations along the moving surfaces. In some examples, any of the marking patterns described with reference to FIGS. 9-13 may be applied to the moving surfaces in any suitable manner (e.g., laser printing, ink application, embossed, raised, painted, coated, etched, or in any other suitable manner). In FIGS. 9-13, the moving surfaces are shown in overhead, top-down views such that the direction of travel of the moving surfaces will be in the vertical direction on the page of FIGS. 9-13.

FIG. 9 illustrates a moving surface 900 including an example ruler marking pattern. The ruler marking pattern may include sequential graduations extending in the vertical direction. The graduations may include any suitable combination of numbers, letters or symbols and orthogonal lines like a ruler. The ruler marking pattern may also include any suitable number of graduations extending opposite the vertical direction in the horizontal direction. The vertical graduations may be used to determine a position of a particular inventory item 40 placed on the moving surface 900 relative to the direction of motion, while the vertical graduations and/or the horizontal graduations may be used to determine an orientation of the particular inventory item 40 on the moving surface 900.

FIG. 10 illustrates a moving surface 1000 including an example geometric marking pattern. The geometric marking pattern may include any suitable combination of repeating patterns. For example, the geometric marking pattern may include a series of horizontal lines with a series of slanted lines intersecting with the series of horizontal lines. In some examples, a series of sequential numbers, letters or symbols may be included on one or both sides of the moving surface 1000. The series of sequential numbers, letters or symbols may be used to determine a position of a particular inventory item 40 placed on the moving surface relative to the direction of motion, while the geometric marking pattern and/or the series of sequential numbers, letters or symbols may be used to determine an orientation of the particular inventory item 40 on the moving surface 1000.

FIG. 11 illustrates a moving surface 1100 including an example barcode marking pattern. The barcode marking pattern may include any suitable number and combination of barcodes applied to the moving surface 1100. In some examples, any other suitable optical markings that are machine-readable may be used. The barcodes of the barcode marking pattern may be disposed along one or both sides of the moving surface 1100. Each barcode may uniquely identify a location along the moving surface 1100. In this manner, identifying a position of a particular inventory item 40 that is placed on the moving surface 1100 may include reading one or more of the barcodes. The barcode marking pattern may also include any suitable combination of lines and/or shapes extending in the horizontal direction (and possibly the vertical direction). These lines and/or shapes and/or the barcodes may be used to determine an orientation of the particular inventory item 40. In some examples, the barcode marking pattern may be disposed throughout the entirety of the moving surface 1100. In this manner, identifying an orientation of the particular inventory item 40 may depend on which barcodes are capable of being read (i.e., are not covered by the particular inventory item 40) and which barcodes are not capable of being read (i.e., are covered by the particular inventory item 40).

FIG. 12 illustrates a moving surface 1200 including an example radio-frequency identification (RFID) marking pattern. The RFID marking pattern may include any suitable number and combination of RFID tags attached to the moving surface 1200. Each of the RFID tags may uniquely identify at least a portion of the moving surface 1200 in the vertical direction. For example, each RFID tag may have a range of around 6 inches. The RFID tags may be arranged in a manner that considers this range. For example, the RFID tags may be placed on 4" centers such that there exist areas where reading two adjacent RFID tags indicates a range + or −2" centered at a midpoint between the two adjacent RFID tags and reading a single RFID tag indicates a range of + or −2" centered at a midpoint of the single RFID tag. Thus, each RFID tag (or combination of RFID tags) may uniquely identify a location along the moving surface 1200. Alternatively, more than 2 RFID tags may be uniquely identified at any time by a respective RFID reader. In this manner, identifying a position of a particular inventory item 40 that is placed on the moving surface 1200 may include reading one or more of the RFID tags. The RFID marking pattern may also include any suitable combination of lines and/or shapes extending in the horizontal direction (and possibly the vertical direction). These lines and/or shapes and/or the RFID tags may be used to determine an orientation of the particular inventory item 40. In some examples, the RFID marking pattern may be disposed throughout the entirety of the moving surface 1200. In this manner, identifying an orientation of the particular inventory item 40 may depend on which RFID tags are capable of being read (i.e., are not blocked/covered by the particular inventory item 40) and which RFID tags are not capable of being read (i.e., are blocked/covered by the particular inventory item 40).

FIG. 13 illustrates a moving surface 1300 including an example grid marking pattern. The grid marking pattern may include a set of cells organized into rows and columns, or according to some other pattern. Each cell may include an indicator. In this example, rows are identified in the horizontal direction as A-E, and columns are identified in the vertical direction as 1-7. In this manner, each cell may be identified with the appropriate column identifier and row identifier. In some examples, identifying a position of a particular inventory item 40 that is placed on the moving surface 1300 may include identifying in which cell(s) the particular inventory item 40 is located, in particular, in which rows and columns the particular inventory item 40 is located. In some examples, identifying an orientation of the particular inventory item 40 may include identifying the orientation of the particular inventory item 40 with respect to the set of cells.

Other example of marking patterns may include, for example, variations of the above including variations in color and other combinations of color. In some examples, a marking pattern may include a random pattern or pre-specified image that has been previously painted or otherwise applied to the moving surface. For example, the random pattern may have a random distribution of colors, lines, shapes, shading, patterns, markings, symbols and the like. The pre-specified image may have a specified distribution of colors, lines, shapes, shading, patterns, markings, symbols and the like. In some examples, sensors described herein may be used to capture one or more images of the moving surface including the random pattern or pre-specified image in a state in which no inventory items 40 are on the moving surface. Based at least in part on the one or more images, a map may be created that includes a depiction of the moving surface, including the random pattern or pre-specified image. The map may associate locations on the moving surface with respect to other locations. For example, a certain location on the map may correspond to a certain location on the moving surface and may be defined as such. In this manner, the random pattern or pre-specified image may be used to learn relative locations on the moving surface. The relative locations may be stored in the map, which may be accessed as part of determining a position of an inventory item 40 on the moving surface.

Figure 14:
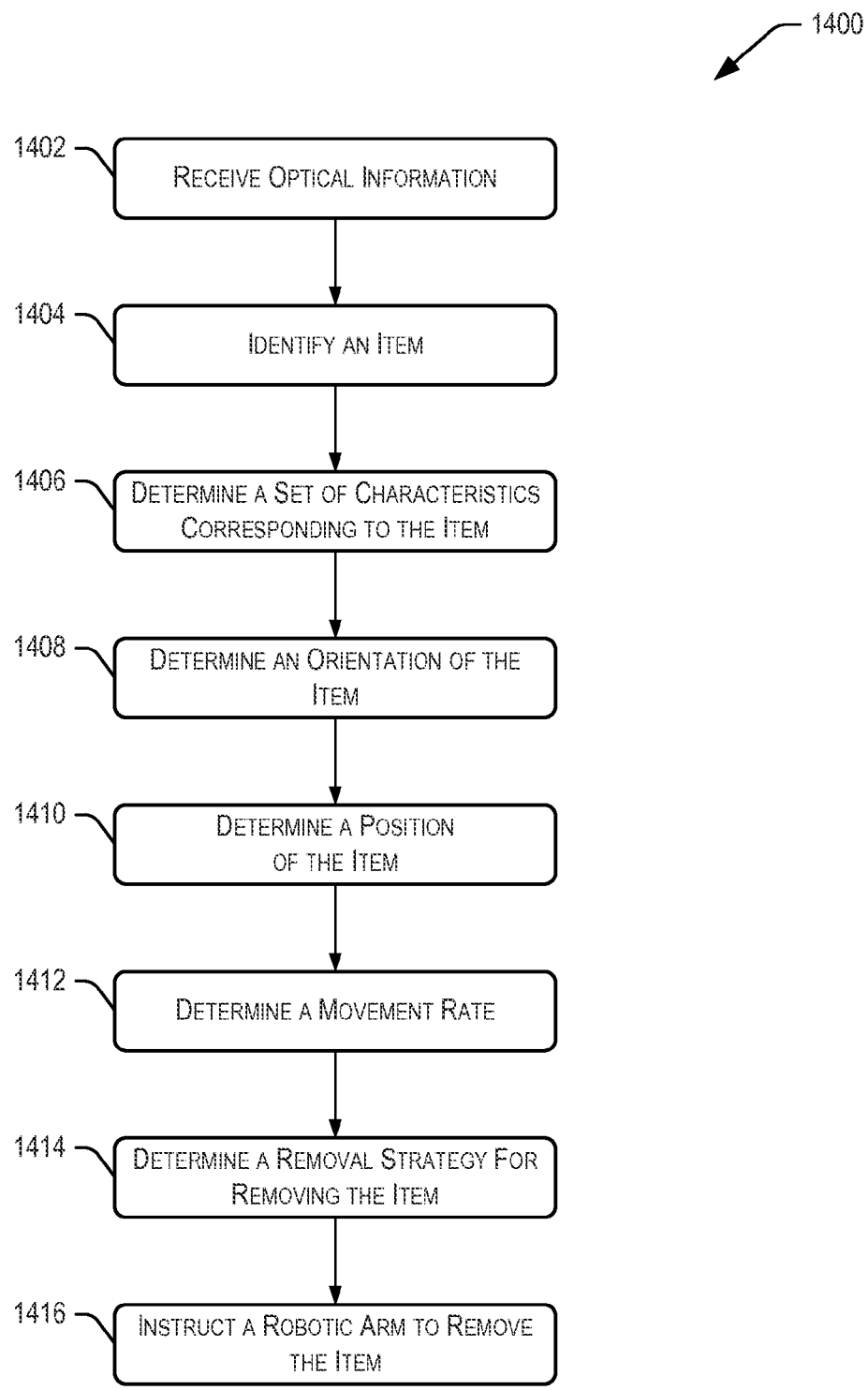
FIG. 14 illustrates a flow diagram depicting example acts for implementing techniques relating to removal of items from moving surfaces by robotic manipulators as described herein, according to at least one embodiment.
Figure 15:
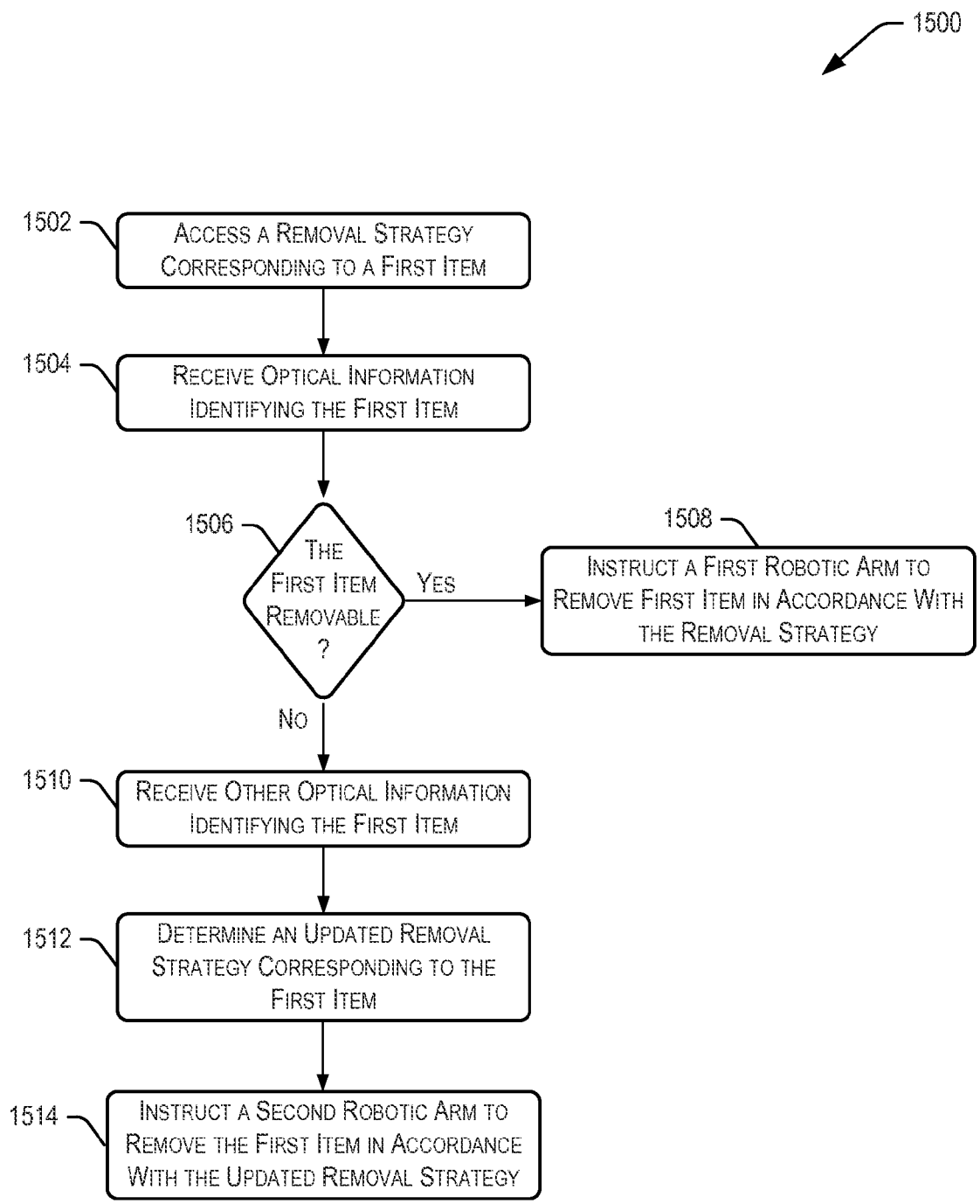
FIG. 15 illustrates a flow diagram depicting example acts for implementing techniques relating to removal of items from moving surfaces by robotic manipulators as described herein, according to at least one embodiment.

FIGS. 14 and 15 illustrate example flow diagrams showing respective processes 1400 and 1500 as described herein. These processes 1400 and 1500 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 14 depicts the process 1400 including example acts or techniques relating to removal of items from moving surfaces by robotic manipulators as described herein. The removal module 99 (FIGS. 3 and 4) of the management module 15 (FIG. 3) may perform the process 1400 of FIG. 14. The process 1400 begins at 1402 by receiving optical information. In some examples, receiving the optical information may be performed by the sensor management component 402 (FIG. 4). Receiving the optical information may include receiving the optical information from one or more sensors configured to collect the optical information of items on a moving surface. Thus, the optical information may describe an inventory item, an area of the moving surface surrounding the inventory item, and any adjacent inventory items. In some examples, the optical information may include one or more images depicting the inventory item, the area of the moving surface surrounding the inventory item, and any adjacent inventory items. In some examples, the optical information may be collected as inventory items are loaded onto the moving surface, or at least after the inventory items have been loaded onto the moving surface.

At 1404, the process 1400 identifies an item. In some examples, identifying the item may be performed by the identification component 404 (FIG. 4). Identifying the item may include identifying the item based at least in part on the optical information. For example, the optical information may identify one or more attributes of the item. These one or more attributes may be used by the identification component to access a database of records pertaining to inventory items. The database of records may be queried to retrieve a record that includes matching attributes. In some examples, the optical information may include textual information (e.g., "Brand X Phone") corresponding to the item. The identification component may use this textual information to identify the item and/or a class of items to which the item belongs. In some examples, identifying the item may be received from an inventory management system. For example, as the item is loaded onto the moving surface, its identity may be recorded (e.g., by scanning a barcode associated with the item). In some examples, an item order including adjacent items may also be recorded or its position with respect to the moving surface may be recorded (e.g., by scanning a barcode, symbols or markings associated with the moving surface at the position where the item was placed). This information may be used later to determine the removal strategy.

At 1406, the process 1400 determines a set of characteristics corresponding to the item. In some examples, determining the set of characteristics may be performed by the identification component 404. Determining the set of characteristics may include accessing the set of characteristics from a database using the identity of the item identified at 1404. For example, the item may be associated with the set of characteristics, which may be stored in the database. The set of characteristics may include a geometric characteristic of the item, a mass of the item, a surface characteristic of the item, a deformability of the item, a structural integrity of the item, a variability of the item, a characteristic determined from the optical information (e.g., a detected attribute), and/or a characteristic determined based on stored information about the item.

At 1408, the process 1400 determines an orientation of the item. In some examples, determining the orientation may be performed by the position component 408 (FIG. 4). Determining the orientation may include determining the orientation with respect to items that are adjacent to the item. In some examples, the orientation may be determined with respect to an inventory conveyance system or a component of the inventory conveyance system. In some examples, the orientation is determined based at least in part on the optical information. For example, the optical information may depict certain information (e.g., one or more fiducial indicators or marking patterns) that can be used to determine the orientation. In some examples, determining the orientation includes determining the orientation at a first time. In some examples, determining the orientation includes determining the orientation at a first time and at a second time. In some examples, at the second time, a second orientation may be determined that is different than the first. This may be a result of adjacent items being moved, the item moving, or for any other suitable reason. In some examples, when the first and second orientations are similar, it may be determined that the item is stable and can be removed according to a removal strategy.

At 1410, the process 1400 determines a position of the item. In some examples, determining the position of the item may be performed by the position component 408. Determining the position may include determining the position with respect to an inventory conveyance system or a component of the inventory conveyance system. In some examples, the position is determined based at least in part on the optical information. For example, the optical information may depict certain information (e.g., one or more fiducial indicators or marking patterns) that can be used to determine the position. In some examples, the position may represent an absolute position of the item along the moving surface.

At 1412, the process 1400 determines a movement rate. In some examples, determining the movement rate may be performed by the sensor management component 402. Determining the movement rate may include receiving the movement rate from a sensor associated with the inventory conveyance system. In some examples, the movement rate may indicate a speed and/or direction at which a moving surface is moving. Because the items may be located on the moving surface, the speed may also correspond directly to the speed of the items. In some examples, the movement rate may be computed based on information captured from one or more sensors.

At 1414, the process 1400 determines a removal strategy for removing the item. In some examples, determining the removal strategy may be performed by the removal strategy component 410 (FIG. 4). Determining the removal strategy may be based at least in part on the identity of the item, the position of the item, the orientation of the item, the movement rate, characteristics of the item, and/or any other suitable information describing the existent conditions from which the item will be removed. The removal strategy may identify the item to be removed and certain aspects about how the item will be removed. In some examples, the removal strategy may indicate a beginning orientation for a robotic arm to begin its approach toward the item. For example, the robotic arm should be oriented above the item, in front of the item, in back of the item, or other orientation. Such an orientation may be desirable in order to effectively grasp and remove the item. The removal strategy may also include a trajectory for the robotic arm to follow as it approaches the item, grasps the item, and removes the item. The trajectory may be determined in a manner that seeks to avoid contact with other items. The trajectory may define how each joint of the robotic arm is to operate at different times. For example, at time=0, each joint is moved to the beginning orientation. At time=1, certain joints bend so that an end effector can be directed toward the item. At time=2, certain joints bend so that the end effector can grasp the item. At time=3, certain joints bend so that the end effector may begin to move away from the item. At time=4, certain joints bend to move the robotic arm to the drop position at which time the item is dropped. At time=5, certain joints bend so that the robotic arm returns to the beginning orientation or some other orientation. In some examples, the removal strategy may identify a grasping strategy, as may be determined by the grasping strategy component 406 (FIG. 4), for the end effector to grasp the item. In some example, the removal strategy is based at least in part on a grasping strategy that has been previously determined for the item. In some examples, determining the removal strategy may include accessing the removal strategy, based on the identified item, the position of the item, the orientation of the item, the movement rate, characteristics of the item, and/or any other suitable information describing the existent conditions from which the item will be removed, from a database of removal strategies.

At 1416, the process 1400 instructs a robotic arm to remove the item. In some examples, instructing the robotic arm may be performed by the control component 412 (FIG. 4). Instructing the robotic arm may include instructing the robotic arm to remove the item in accordance with the removal strategy determined at 1414. This may include providing the removal strategy to a controller configured to manage the operation of the robotic arm, and allowing the controller to generate the particular instructions for operating the robotic arm to execute the removal strategy. In some examples, instructing the robotic arm may include generating instructions to cause the robotic arm to move to a beginning orientation, to cause the robotic arm to move from the beginning orientation along the trajectory toward the item, and to cause the robotic arm to grasp the item and remove the item from the moving surface while the item is moving with the moving surface.

FIG. 15 depicts the process 1500 including example acts or techniques relating to removal of items from moving surfaces by robotic manipulators as described herein. The removal module 99 (FIGS. 3 and 4) of the management module 15 (FIG. 3) may perform the process 1500 of FIG. 15. In some examples, the process 1500 may be performed by a computing device configured to manage the operation of one or more robotic arms. The process 1500 begins at 1502 by accessing a removal strategy corresponding to a first item. In some examples, accessing the removal strategy may be performed by the removal strategy component 410 (FIG. 4). Accessing the removal strategy may include receiving the removal strategy from a database of removal strategies. In some examples, accessing the removal strategy may include receiving the removal strategy.

At 1504, the process 1500 receives optical information identifying the first item. In some examples, receiving the optical information may be performed by the sensor management component 402 (FIG. 4). The optical information may be received from a sensor associated with a robotic arm. In some examples, receiving the optical information may be performed as the robotic arm begins to execute the removal strategy. For example, the sensor may be located in a suitable location in order to sense movement of an end effector and other components of the robotic arm and to sense movement of the first item. In some examples, the optical information identifying the first item may identify conditions of the first item at a time when the optical information is received. In some examples, the optical information is received at a later time after the removal strategy has been determined based on other optical information.

At 1506, the process 1500 determines whether the first item is removable. In some examples, determining whether the first item is removable may be performed by the control component 412 (FIG. 4). Determining whether the first item is removable may include comparing the removal strategy with the optical information in order to determine whether similar conditions exist between the initial conditions and the conditions existent when the optical information is received. In some examples, the removal strategy may indicate that the item is removable as of the time when the removal strategy was determined. However, at a later time, the first item may not be removable as a result of its position and/or orientation changing, other items blocking access to the first item, or any other condition that has changed. In some examples, determining whether the first item is removable includes receiving a notification from the robotic arm indicating that the item is removable or not removable.

If the answer at 1506 is YES, the process 1500 proceeds to 1508. At 1508, the process 1500 instructs a first robotic arm to remove the first item in accordance with the removal strategy. In some examples, instructing the first robotic arm may be performed by the control component 412 as described herein.

If the answer at 1506 is NO, the process 1500 proceeds to 1510. At 1510, the process 1500 receives other optical information identifying the first item. In some examples, receiving the other optical information may be performed by the sensor management component 402. Receiving the other optical information may include receiving the optical information from one or more sensors configured to collect optical information corresponding to items moving along the moving surface. Thus, the other optical information may be collected from a different sensor (or set of sensors) than the optical information received at 1504. In some examples, the same sensor that collected the sensing information at 1504 also collects the other sensing information at 1510. In some examples, the other optical information identifies the item under different conditions than existing when the removal strategy was determined.

At 1512, the process 1500 determines an updated removal strategy corresponding to the first item. In some examples, determining the updated removal strategy may be performed by the removal strategy component 410. Determining the updated removal strategy may be based on the other optical information and in accordance with techniques described herein.

At 1514, the process 1500 instructs a second robotic arm to remove the first item in accordance with the updated removal strategy. In some examples, instructing the second robotic arm may be performed by the control component 412 as described herein.

Figure 16:
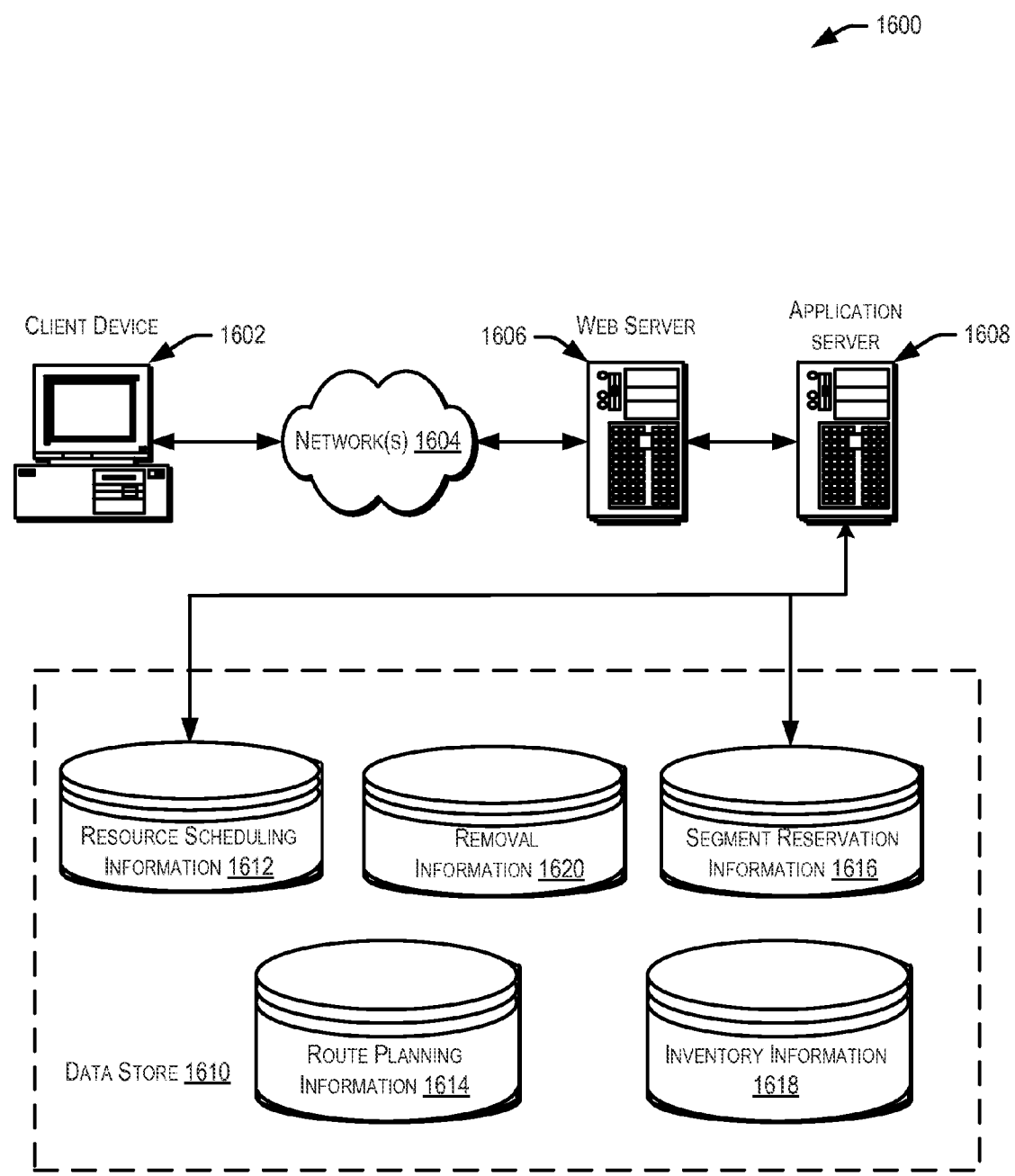
FIG. 16 illustrates an environment in which various features of the inventory system can be implemented, according to at least one embodiment.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing information which can be used by modules described herein, such as resource scheduling information 1612, route planning information 1614, segment reservation information 1616, inventory information 1618, and/or removal information 1620. It should be understood that there can be many other aspects that may need to be stored in the data store, such as page image information and access right information, which can be stored in any of the above-listed mechanisms as appropriate or in additional mechanisms in the data store 1610. The data store 1610 is operable, through logic associated therewith, to receive instructions from the application server 1608 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the description herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the environment 1600 in FIG. 16 should be taken as being illustrative in nature and not limiting to the scope of the description.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including, without limitation, those commercially available from Oracle®, Microsoft®, Sybasex®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the description and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

Other variations are within the spirit of the present description. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this description are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents cited herein are hereby incorporated by reference to the same extent as if each reference were individually and specifically indicated to be incorporated by reference and were set forth in its entirety herein.

What is claimed is:

1. A system, comprising:
  an inventory conveyance system configured to move a plurality of items along a moving surface, at least some items of the plurality of items differing from one another;
  a robotic manipulator configured to move in at least three dimensions and to grasp items of the plurality of items;

an imaging device configured to at least capture images of one or more items of the plurality of items moving on the inventory conveyance system; and a management module configured to:
- receive at least one image from the imaging device, the at least one image depicting a portion of the plurality of items and a portion of the moving surface adjacent to the portion of the plurality of items, the portion of the moving surface comprising a marking pattern;
- identify, based at least in part on the at least one image, a particular item of the plurality of items moving on the inventory conveyance system;
- determine, based at least in part on the at least one image, an orientation of the particular item with respect to the inventory conveyance system;
- determine a movement rate corresponding to the inventory conveyance system; and
- determine, based at least in part on (i) the particular item, (ii) the orientation the particular item, and (iii) the movement rate, a removal strategy for operating the robotic manipulator to remove the particular item from the inventory conveyance system while the particular item is moving on the inventory conveyance system, the removal strategy identifying the particular item and including a trajectory for the robotic manipulator to follow as part of removing the particular item from the inventory conveyance system.

2. The system of claim 1, wherein the management module is further configured to identify a set of characteristics of the particular item, the set of characteristics comprising at least one of:
- a mass of the particular item;
- a geometric characteristic of the particular item;
- a surface characteristic of the particular item;
- a deformability of the particular item;
- a structural integrity of the particular item;
- a variability of the particular item;
- a characteristic determined based on information received about the particular item from one or more sensors; or
- a characteristic determined based on stored information about the particular item, wherein determining the removal strategy is further based at least in part on the set of characteristics of the particular item.

3. The system of claim 1, wherein the management module is further configured to:
- generate instructions to cause the robotic manipulator to move to a beginning orientation with respect to the particular item;
- generate instructions to cause the robotic manipulator to move from the beginning orientation along the trajectory toward the particular item based on the removal strategy; and
- generate instructions to cause the robotic manipulator to grasp the particular item and remove the particular item from the inventory conveyance system based on the removal strategy.

4. The system of claim 1, wherein:
the marking pattern comprises one or more fiducial indicators that indicate a particular position on the moving surface; and
determining the orientation of the particular item with respect to the inventory conveyance system comprises determining the orientation of the particular item with respect to the one or more fiducial indicators on the moving surface.

5. A computer-implemented method, comprising:
- identifying an item from among a plurality of items that is located on a moving surface of an inventory conveyance system, the item having one or more characteristics;
- receiving sensing information from a sensor disposed adjacent to the moving surface;
- determining, based at least in part on the sensing information, an orientation of the item with respect to the moving surface, the sensing information describing at least a portion of the item and a portion of the moving surface surrounding the item, the portion of the moving surface comprising a marking pattern;
- determining, based at least in part on the one or more characteristics and the orientation of the item, a removal strategy for operating a robotic arm to remove the item from the moving surface, the removal strategy comprising a trajectory for the robotic arm to follow as part of removing the item from the moving surface, the robotic arm disposed adjacent to the moving surface;
- in response to determining the removal strategy, generating instructions for the robotic arm to remove the item from the moving surface in accordance with the removal strategy; and
- providing the instructions to the robotic arm for execution by the robotic arm.

6. The computer-implemented method of claim 5, wherein determining the orientation of the item with respect to the moving surface includes determining the orientation of the item with respect to the marking pattern of the moving surface.

7. The computer-implemented method of claim 6, wherein the marking pattern comprises at least one of:
- a subset of a set of alphanumerical indicators disposed along the moving surface;
- a subset of a set of grid indicators disposed along the moving surface;
- a subset of a set of shape indicators disposed along the moving surface;
- a subset of a set of barcode indicators disposed along the moving surface;
- a subset of a set of radio-frequency identification (RFID) tags disposed along the moving surface; or
- a portion of a random marking pattern disposed along the moving surface.

8. The computer-implemented method of claim 5, wherein the sensing information further describes an adjacent item located near the item on the moving surface, and wherein determining the removal strategy is further based at least in part on the adjacent item.

9. The computer-implemented method of claim 5, further comprising determining a movement rate of the moving surface, the movement rate corresponding to the item, and wherein determining the removal strategy is further based at least in part on the movement rate.

10. The computer-implemented method of claim 5, wherein the plurality of items include at least some items that differ from one another, and wherein the robotic arm is configured to grasp items of the plurality of items.

11. The computer-implemented method of claim 5, further comprising:
- receiving a notification that the robotic arm was unable to remove the item from the moving surface; and
- in response to receiving the notification, generating second instructions for a second robotic arm to remove the item from the moving surface in accordance with a second removal strategy.

12. The computer-implemented method of claim 5, wherein the sensor is a camera and the sensing information comprises one or more images depicting the item and captured by the camera, and wherein identifying the item includes identifying the item based at least in part on the one or more images.

13. The computer-implemented method of claim 5, wherein the orientation of the item comprises a first orientation associated with a first time when the sensing information was collected, the method further comprising:
   receiving second sensing information, the second sensing information describing the item and the portion of the moving surface, the second sensing information collected at a second time that is later than the first time;
   determining, based at least in part on the second sensing information, a second orientation of the item with respect to the moving surface; and
   determining, based at least in part on the first orientation and the second orientation, that the item is stable,
   wherein generating the instructions for the robotic arm to remove the item from the moving surface in accordance with the removal strategy is based at least in part on determining that the item is stable.

14. The computer-implemented method of claim 5, wherein generating the instructions for the robotic arm to remove the item from the moving surface in accordance with the removal strategy comprises:
   generating first instructions to cause the robotic arm to move to a beginning orientation with respect to the item;
   generating second instructions to cause the robotic arm to move from the beginning orientation along the trajectory toward the item based on the removal strategy; and
   generating third instructions to cause the robotic arm to grasp the item and remove the item from the moving surface based on the removal strategy.

15. The computer-implemented method of claim 5, further comprising:
   identifying a different item that is located on the moving surface based at least in part on different sensing information received from the sensor;
   accessing, from a removal database, a pre-computed removal strategy corresponding to items having similar characteristics to the different item; and
   determining whether the different item is removable from the moving surface by the robotic arm based at least in part on the pre-computed removal strategy.

16. A system, comprising:
   an inventory conveyance system configured to move a plurality of items via a moving surface, a first item of the plurality of items having a first shape and a second item of the plurality of items having a second shape that is distinct from the first shape;
   a camera configured to capture one or more images of the plurality of items;
   a first robotic manipulator having at least two dimensions of freedom and configured to grasp at least the first item and the second item; and
   a management module configured to:
      receive an image from the camera, the image at least depicting, at a first time, (i) at least a portion of the first item, (ii) at least a portion of the second item, and (iii) an orientation of the first item with respect to the second item;
      identify, based at least in part on the image, the first item; and
      determine, based at least in part on (i) the identified first item, (ii) a movement rate corresponding to the moving surface, and (iii) the orientation of the first item with respect to the second item, a removal strategy for operating the first robotic manipulator to remove the first item from the moving surface without contacting the second item.

17. The system of claim 16, wherein the first robotic manipulator comprises an optical sensor configured to capture optical information describing the plurality of items, and wherein the management module is further configured to:
   instruct the first robotic manipulator to remove the first item in accordance with the removal strategy;
   receive a portion of the optical information from the optical sensor, the portion of the optical information at least describing the first item and the second item at a second time, the first item having a different orientation with respect to the second item at the second time;
   determine, based at least in part on (i) the identified first item, (ii) the movement rate corresponding to the moving surface, and (iii) the different orientation of the first item with respect to the second item, an updated removal strategy for operating the first robotic manipulator to remove the first item from the moving surface without contacting the second item; and
   instruct the first robotic manipulator to remove the first item in accordance with the updated removal strategy instead of the removal strategy.

18. The system of claim 16, further comprising:
   a second robotic manipulator having at least two dimensions of freedom and configured to grasp at least the first item and the second item, and wherein the management module is further configured to:
   determine, based at least in part on a set of characteristics corresponding to the first item, that the first item be removed using two or more robotic manipulators acting in coordination with each other; and
   instruct the first robotic manipulator and the second robotic manipulator to remove the first item by acting in coordination with each other and in accordance with the removal strategy.

19. The system of claim 16, wherein the management module is further configured to determine a position of the first item relative to the moving surface based at least in part on the image, and wherein determining the removal strategy is further based at least in part on the position.

20. The system of claim 16, wherein the management module is further configured to receive the movement rate from a component of the inventory conveyance system, the movement rate indicating a rate at which the moving surface is moving relative to the first robotic manipulator.

21. The system of claim 16, wherein the management module is further configured to:
   determine, based at least in part on a characteristic of the first item, a grasping strategy for grasping the item with the first robotic manipulator so as to form a determined grasping strategy; and
   determine the removal strategy based at least in part on the determined grasping strategy.

22. The computer-implemented method of claim 15, further comprising, in the event the different item is not removable from the moving surface by the robotic arm:
   generating different instructions for a different robotic arm to remove the different item from the moving surface in accordance with the pre-computed removal strategy; and providing the different instructions to the different robotic arm for execution by the different robotic arm.

23. The computer-implemented method of claim 15, further comprising instructing the robotic arm to remove the different item in accordance with the pre-computed removal strategy when the different item is removable from the moving surface by the robotic arm.

\* \* \* \* \*